(12) United States Patent
Kuno et al.

(10) Patent No.: US 12,344,243 B2
(45) Date of Patent: Jul. 1, 2025

(54) VEHICLE COLLISION AVOIDANCE ASSIST APPARATUS AND VEHICLE COLLISION AVOIDANCE ASSIST PROGRAM

(71) Applicants: TOYOTA JIDOSHA KABUSHIKI KAISHA, Toyota (JP); DENSO CORPORATION, Aichi-pref. (JP)

(72) Inventors: Takahiro Kuno, Toyota (JP); Yuusuke Izumi, Tokyo (JP)

(73) Assignees: TOYOTA JIDOSHA KABUSHIKI KAISHA, Toyota (JP); DENSO CORPORATION, Kariya (JP)

( * ) Notice: Subject to any disclaimer, the term of this patent is extended or adjusted under 35 U.S.C. 154(b) by 347 days.

(21) Appl. No.: 17/951,999

(22) Filed: Sep. 23, 2022

(65) Prior Publication Data
US 2023/0098420 A1 Mar. 30, 2023

(30) Foreign Application Priority Data
Sep. 27, 2021 (JP) .................... 2021-156442

(51) Int. Cl.
*B60W 30/095* (2012.01)
(52) U.S. Cl.
CPC ..... *B60W 30/0956* (2013.01); *B60W 2520/06* (2013.01); *B60W 2520/14* (2013.01)
(58) Field of Classification Search
CPC ......... B60W 30/0956; B60W 2520/06; B60W 2520/14; B60W 2554/4029; B60W 2554/4041; B60W 2554/4045; B60W 30/0953; B60W 30/18159
See application file for complete search history.

(56) References Cited

U.S. PATENT DOCUMENTS

| | | | |
|---|---|---|---|
| 9,105,190 B2 | 8/2015 | Akiyama | |
| 9,393,960 B2 | 7/2016 | Kodaira | |
| 9,483,945 B2 | 11/2016 | Okita et al. | |
| 9,873,412 B2 | 1/2018 | Moriizumi | |
| 10,580,303 B2 * | 3/2020 | Morotomi | G08G 1/165 |
| 10,793,147 B2 | 10/2020 | Kaminade et al. | |
| 11,318,934 B2 * | 5/2022 | Ohmura | G06V 20/58 |

(Continued)

FOREIGN PATENT DOCUMENTS

| | | |
|---|---|---|
| JP | 2004-280453 A | 10/2004 |
| JP | 2018-156253 A | 10/2018 |

*Primary Examiner* — Jean Paul Cass
*Assistant Examiner* — Lidia Kwiatkowska
(74) *Attorney, Agent, or Firm* — Sughrue Mion, PLLC

(57) ABSTRACT

A vehicle collision avoidance assist apparatus keeps stopping a collision avoidance control when a forbiddance condition is satisfied, and a collision condition is satisfied. The forbiddance condition is a condition that the collision angle is equal to or greater than a predetermined collision angle threshold. The collision condition is a condition that an own vehicle is going to collide with an object. While the own vehicle turns, the apparatus acquires an own vehicle turning angle which the own vehicle has turned about a turning center from when the own vehicle starts turning and sets the predetermined collision angle threshold such that the predetermined collision angle threshold set for the greater own vehicle turning angle is smaller than the predetermined collision angle threshold set for the smaller own vehicle turning angle.

4 Claims, 16 Drawing Sheets

(56) References Cited

U.S. PATENT DOCUMENTS

| | | |
|---|---|---|
| 2009/0192710 A1* | 7/2009 | Eidehall ............ B60W 50/0097 |
| | | 701/300 |
| 2018/0268702 A1 | 9/2018 | Morotomi et al. |
| 2021/0061309 A1 | 3/2021 | Kawanai |
| 2021/0107521 A1 | 4/2021 | Fujita et al. |
| 2021/0107528 A1 | 4/2021 | Fujita et al. |
| 2021/0146956 A1 | 5/2021 | Fujita et al. |
| 2021/0146958 A1* | 5/2021 | Tanaka ............ B60W 30/18159 |

\* cited by examiner

VEHICLE COLLISION AVOIDANCE ASSIST APPARATUS AND VEHICLE COLLISION AVOIDANCE ASSIST PROGRAM

CROSS-REFERENCE TO RELATED APPLICATIONS

This application claims priority to Japanese patent application No. JP 2021-156442 filed on Sep. 27, 2021, the content of which is hereby incorporated by reference in its entirety.

BACKGROUND

Field

The invention relates to a vehicle collision avoidance assist apparatus and a vehicle collision avoidance assist program.

Description of the Related Art

There is known a vehicle collision avoidance assist apparatus which executes a collision avoidance control for avoiding a collision of an own vehicle with an object such as another vehicle or a person ahead of the own vehicle. The known vehicle collision avoidance assist apparatus is configured to detect the object ahead of the own vehicle, based on information acquired by radars and/or cameras and execute the collision avoidance control to autonomously stop the own vehicle when the known vehicle collision avoidance assist apparatus determines that the own vehicle is going to collide with the detected object.

Further, there is known the vehicle collision avoidance assist apparatus which executes the collision avoidance control for avoiding a collision of the own vehicle with an oncoming vehicle which moves straight through a traffic intersection when the own vehicle is turning right at the same traffic intersection in a country where vehicles are regulated to move on the left-hand side of a road. This known vehicle collision avoidance assist apparatus is configured to predict a route of the own vehicle to turn right and determine whether the own vehicle is going to collide with the oncoming vehicle moving straight through the traffic intersection, based on the predicted route, i.e., a predicted turning route. In this regard, the predicted turning route may be a route through the oncoming vehicle which is stopped in the oncoming lane in a road which the own vehicle turning right reaches. In this case, the own vehicle is determined to be going to collide with the oncoming vehicle in question, and the collision avoidance control is executed. However, the own vehicle does not collide with the vehicle stopped in the oncoming lane in the road which the own vehicle turning right reaches as far as the own vehicle normally turns right. Thus, such an execution of the collision avoidance control is unnecessary.

Accordingly, there is known the vehicle collision avoidance assist apparatus which is configured not to execute the collision avoidance control during the latter half of turning right of the own vehicle at the traffic intersection (for example, see JP 2018-156253 A).

However, a crosswalk or a pedestrian crossing may be provided on the road which the own vehicle turning right reaches. In this case, when the known vehicle collision avoidance assist apparatus is configured not to execute the collision avoidance control during the latter half of the turning right of the own vehicle, the apparatus inconveniently does not execute the collision avoidance control even when the own vehicle is going to collide with a pedestrian walking on the crosswalk or the pedestrian crossing. This is also applied to the case that the own vehicle turns left at the traffic intersection.

SUMMARY

An object of the invention is to provide a vehicle collision avoidance assist apparatus and a vehicle collision avoidance assist program which can avoid an unnecessary execution of the collision avoidance control when the own vehicle turns right or left.

According to the invention, a vehicle collision avoidance assist apparatus comprises an electronic control unit. The electronic control unit is configured to predict a turning route of an own vehicle and a moving route of an object ahead of the own vehicle when the own vehicle turns, acquire a collision angle which corresponds to a deviating amount of a moving direction of the own vehicle from a line orthogonal to the moving route at a point where the turning route crosses the moving route, and keep stopping a collision avoidance control to avoid a collision of the own vehicle with the object when a forbiddance condition is satisfied, and a collision condition is satisfied. The forbiddance condition being a condition that the collision angle is equal to or greater than a predetermined collision angle threshold. The collision condition being a condition that the own vehicle is going to collide with the object. The electronic control unit is configured to execute the collision avoidance control when the forbiddance condition is not satisfied, and the collision condition is satisfied.

While the own vehicle turns, the electronic control unit is configured to acquire an own vehicle turning angle which is an angle which the own vehicle has turned about a turning center from when the own vehicle starts turning and set the predetermined collision angle threshold such that the predetermined collision angle threshold set for the greater own vehicle turning angle is smaller than the predetermined collision angle threshold set for the smaller own vehicle turning angle.

In general, while the own vehicle turns right at the traffic intersection, a steering angle of the own vehicle gradually increases during the first half of turning right of the own vehicle. Then, the steering angle gradually decreases during the latter half of the turning right of the own vehicle. When the own vehicle completes turning right, the steering angle is zero. Thus, in general, a turning radius of an actual route along which the own vehicle turns right gradually decreases during the first half of the turning right of the own vehicle. Then, the turning radius gradually increases during the latter half of the turning right of the own vehicle. After the own vehicle completes turning right, the turning radius is infinite. That is, after the own vehicle completes turning right, the own vehicle moves straight.

If the own vehicle collides with the object such as the person crossing the road which the own vehicle turning right reaches, the own vehicle collides with the object immediately before or after the own vehicle completes turning right and starts to move straight. Thus, an angle defined by the moving direction of the own vehicle and a moving direction of the object is generally 90 degrees when the own vehicle collides with the object. Thus, in general, the angle defined by the moving directions of the own vehicle and the object is considerably deviated from 90 degrees before the middle of the turning right of the own vehicle. As the own vehicle turns right further, the angle defined by the moving directions of the own vehicle and the object gradually comes close to 90 degrees. When the own vehicle collides with the object, the angle defined by the moving directions of the own vehicle and the object takes a value near 90 degrees.

Thus, even when the collision angle acquired, based on the predicted turning route is relatively great, a probability that the own vehicle collides with the object is high before the middle of the turning right of the own vehicle when the collision condition is determined to be satisfied, based on the predicted turning route. On the other hand, after the middle of the turning right of the own vehicle, when the collision angle acquired, based on the predicted turning route is relatively great, and the collision condition is determined to be satisfied, based on the predicted turning route, the possibility that the own vehicle collides with the object is low. This is also applied to a scene that the own vehicle turns left at the traffic intersection.

With the invention, when the forbiddance condition that the collision angle is equal to or greater than the predetermined collision angle threshold, is satisfied, the collision avoidance control is not executed in response to the collision condition being satisfied. In addition, the predetermined collision angle threshold set for the greater own vehicle turning angle is smaller than the predetermined collision angle threshold set for the smaller own vehicle turning angle. Thus, before the middle of the turning right of the own vehicle, when the collision condition is determined to be satisfied, based on the predicted turning route of the own vehicle, and the collision angle acquired, based on the predicted turning route of the own vehicle is relatively great, the collision avoidance control is executed. On the other hand, after the middle of the turning right of the own vehicle, when the collision condition is determined to be satisfied, based on the predicted turning route of the own vehicle, and the collision angle acquired, based on the predicted turning route of the own vehicle is relatively great, the collision avoidance control is not executed. Thus, the unnecessary execution of the collision avoidance control can be avoided when the own vehicle turns right or left.

According to an aspect of the invention, the electronic control unit may be configured to predict the turning route of the own vehicle, based on a yaw rate of the own vehicle.

With this aspect of the invention, the turning route of the own vehicle can be predicted, based on the yaw rate of the own vehicle which can be acquired by a sensor such as a yaw rate sensor.

According to another aspect of the invention, the electronic control unit may be configured to acquire a predicted reaching time which is a time predicted to be taken for the own vehicle to reach the moving route of the object and acquire an object position which is a position of the object with respect to the own vehicle when the own vehicle reaches the moving route of the object. In this aspect, the collision condition may become satisfied when the predicted reaching time is equal to or smaller than a predetermined predicted reaching time, and the object position is within a width of the own vehicle.

With this aspect of the invention, whether the own vehicle is going to collide with the object, i.e., whether the collision condition is satisfied, is determined, based on (i) the predicted reaching time predicted to be taken until the own vehicle reaches the moving route of the object and (ii) the object position of the object with respect to the own vehicle when the own vehicle reaches the moving route of the object. Thus, the probability that the own vehicle collides with the object can be accurately determined.

According to the invention, a vehicle collision avoidance assist program is programmed to predict a turning route of an own vehicle and a moving route of an object ahead of the own vehicle when the own vehicle turns, acquire a collision angle which corresponds to a deviating amount of a moving direction of the own vehicle from a line orthogonal to the moving route at a point where the turning route crosses the moving route, and keep stopping a collision avoidance control to avoid a collision of the own vehicle with the object when a forbiddance condition is satisfied, and a collision condition is satisfied. The forbiddance condition being a condition that the collision angle is equal to or greater than a predetermined collision angle threshold. The collision condition being a condition that the own vehicle is going to collide with the object. The vehicle collision avoidance assist program is programmed to execute the collision avoidance control when the forbiddance condition is not satisfied, and the collision condition is satisfied.

While the own vehicle turns, the vehicle collision avoidance assist program is programmed to acquire an own vehicle turning angle which is an angle which the own vehicle has turned about a turning center from when the own vehicle starts turning and set the predetermined collision angle threshold such that the predetermined collision angle threshold set for the greater own vehicle turning angle is smaller than the predetermined collision angle threshold set for the smaller own vehicle turning angle.

With this aspect of the invention, for the same reasons described above, the unnecessary execution of the collision avoidance control can be avoided when the own vehicle turns right or left.

Elements of the invention are not limited to elements of embodiments and modified examples of the invention described with reference to the drawings. The other objects, features and accompanied advantages of the invention can be easily understood from the embodiments and the modified examples of the invention.

DESCRIPTION OF THE EMBODIMENTS

Figure 1:
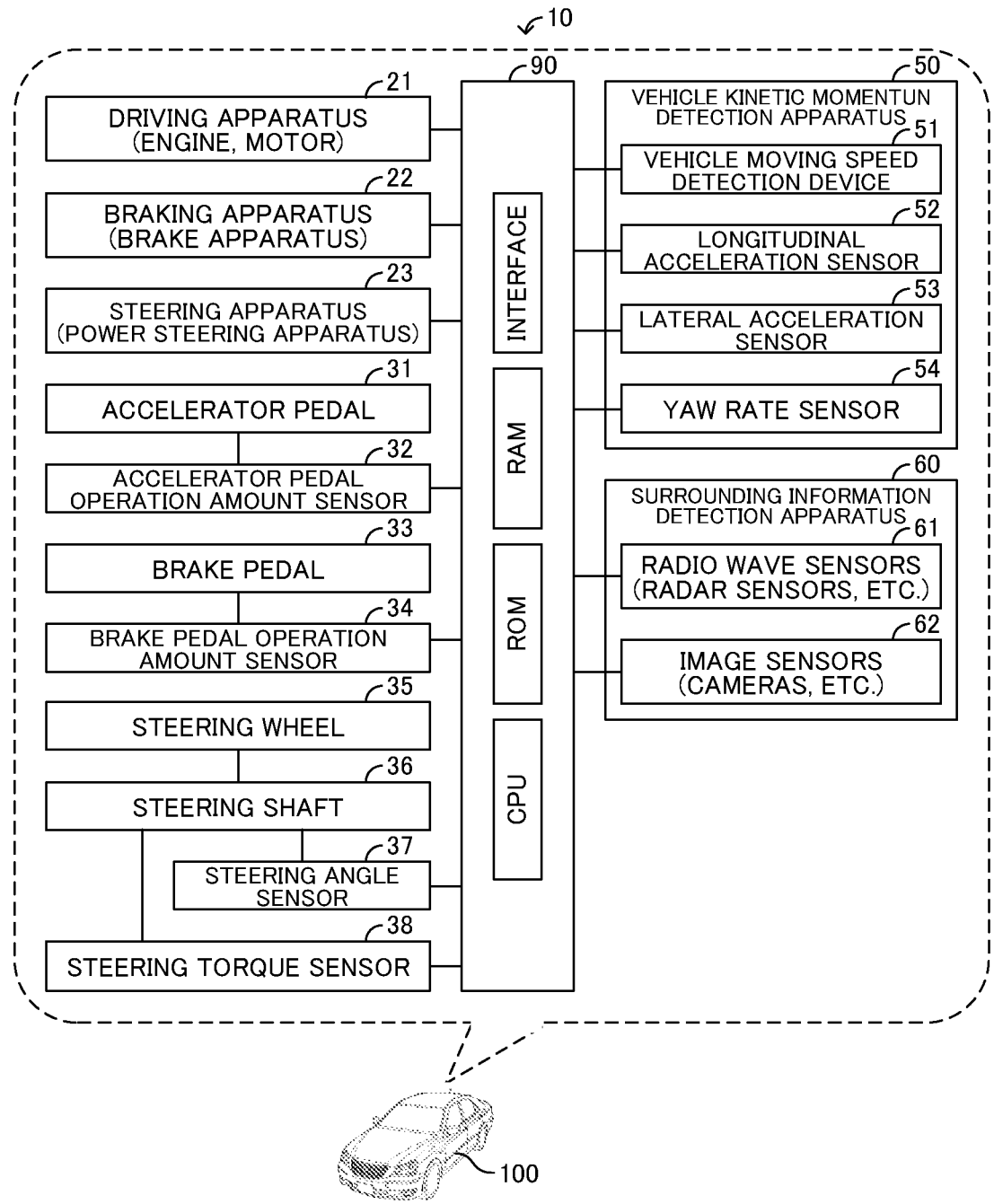
FIG. 1 is a view which shows a vehicle collision avoidance assist apparatus according to an embodiment of the invention and a vehicle, i.e., an own vehicle on which the vehicle collision avoidance assist apparatus is installed.

Below, a vehicle collision avoidance assist apparatus according to an embodiment of the invention will be described with reference to the drawings. It should be noted that the invention can be applied to an autonomous driving vehicle or an automatic driving vehicle. As shown in FIG. 1, the vehicle collision avoidance assist apparatus 10 according to the embodiment of the invention is installed on an own vehicle 100. Hereinafter, a driver of the own vehicle 100 will be referred to as "driver DR."

<ECU>

The vehicle collision avoidance assist apparatus 10 includes an ECU 90 as a control device. The ECU 90 is an electronic control unit. The ECU 90 includes a microcomputer as a main component. The microcomputer includes a CPU, a ROM, a RAM, a non-volatile memory, and an interface. The CPU is configured or programmed to realize various functions by executing instructions, programs, or routines stored in the ROM.

<Driving Apparatus, Etc.>

A driving apparatus 21, a braking apparatus 22, and a steering apparatus 23 are installed on the own vehicle 100.

<Driving Apparatus>

The driving apparatus 21 is an apparatus which outputs a driving torque or a driving force to be applied to the own vehicle 100 to move the own vehicle 100. The driving apparatus 21 may include an internal combustion engine and at least one electric motor. The driving apparatus 21 is electrically connected to the ECU 90. The ECU 90 can control the driving torque output from the driving apparatus 21 by controlling operations of the driving apparatus 21.

<Braking Apparatus>

The braking apparatus 22 is an apparatus which outputs a braking torque or a braking force to be applied to the own vehicle 100 to brake the own vehicle 100. The braking apparatus 22 may be a brake apparatus. The braking apparatus 22 is electrically connected to the ECU 90. The ECU 90 can control the braking torque output from the braking apparatus 22 by controlling operations of the braking apparatus 22.

<Steering Apparatus>

The steering apparatus 23 is an apparatus which outputs a steering torque or a steering force to be applied to the own vehicle 100 to steer the own vehicle 100. The steering apparatus 23 may be a power steering apparatus. The steering apparatus 23 is electrically connected to the ECU 90. The ECU 90 can control the steering torque output from the steering apparatus 23 by controlling operations of the steering apparatus 23.

<Sensors, Etc.>

Further, an accelerator pedal 31, an accelerator pedal operation amount sensor 32, a brake pedal 33, a brake pedal operation amount sensor 34, a steering wheel 35, a steering shaft 36, a steering angle sensor 37, a steering torque sensor 38, a vehicle kinetic momentum detection apparatus 50, and a surrounding information detection apparatus 60 are installed on the own vehicle 100.

<Accelerator Pedal Operation Amount Sensor>

The accelerator pedal operation amount sensor 32 is a sensor which detects an operation amount of the accelerator pedal 31. The accelerator pedal operation amount sensor 32 is electrically connected to the ECU 90. The accelerator pedal operation amount sensor 32 sends information on the detected operation amount of the accelerator pedal 31 to the ECU 90. The ECU 90 acquires the operation amount of the accelerator pedal 31 as an accelerator pedal operation amount AP, based on the information sent from the accelerator pedal operation amount sensor 32. The ECU 90 calculates and acquires a requested driving torque or a requested driving force, based on the accelerator pedal operation amount AP and an own vehicle moving speed, i.e., a moving speed of the own vehicle 100 when a collision avoidance control described later in detail is not executed. The requested driving torque is the driving torque requested for the driving apparatus 21 to output. The ECU 90 controls the operations of the driving apparatus 21 so as to output the driving torque corresponding to the requested driving torque.

<Brake Pedal Operation Amount Sensor>

The brake pedal operation amount sensor 34 is a sensor which detects an operation amount of the brake pedal 33. The brake pedal operation amount sensor 34 is electrically connected to the ECU 90. The brake pedal operation amount sensor 34 sends information on the detected operation amount of the brake pedal 33 to the ECU 90. The ECU 90 acquires the operation amount of the brake pedal 33 as a brake pedal operation amount BP, based on the information sent from the brake pedal operation amount sensor 34. The ECU 90 calculates and acquires a requested braking torque or a requested braking force, based on the brake pedal operation amount BP when the collision avoidance control described later in detail is not executed. The requested braking torque is the braking torque requested for the braking apparatus 22 to output. The ECU 90 controls the operations of the braking apparatus 22 so as to output the braking torque corresponding to the requested braking torque.

<Steering Angle Sensor>

The steering angle sensor 37 is a sensor which detects a rotation angle of the steering shaft 36 with respect to its neutral position. The steering angle sensor 37 is electrically connected to the ECU 90. The steering angle sensor 37 sends information on the detected rotation angle of the steering shaft 36 to the ECU 90. The ECU 90 acquires the rotation angle of the steering shaft 36 as a steering angle θ, based on the information sent from the steering angle sensor 37. In this embodiment, the ECU 90 acquires the positive steering angle θ when the steering wheel 35 is rotated to rotate the steering shaft 36 clockwise. On the other hand, the ECU 90 acquires the negative steering angle θ when the steering wheel 35 is rotated to rotate the steering shaft 36 counterclockwise. When the steering wheel 35 is at its neutral position, and thus the steering shaft 36 is also at its neutral position, the steering angle θ which the ECU 90 acquires, is zero.

<Steering Torque Sensor>

The steering torque sensor 38 is a sensor which detects a torque which the driver DR inputs to the steering shaft 36 via the steering wheel 35. The steering torque sensor 38 is electrically connected to the ECU 90. The steering torque sensor 38 sends information on the detected torque to the ECU 90. The ECU 90 acquires the torque which the driver DR inputs to the steering shaft 36 via the steering wheel 35 as a driver input torque TQdr, based on the information sent from the steering torque sensor 38.

<Vehicle Kinetic Momentum Detection Apparatus>

The vehicle kinetic momentum detection apparatus 50 is an apparatus which detects kinetic momentum of the own vehicle 100. In this embodiment, the vehicle kinetic momentum detection apparatus 50 includes a vehicle moving speed detection device 51, a longitudinal acceleration sensor 52, a lateral acceleration sensor 53, and a yaw rate sensor 54.

<Vehicle Moving Speed Detection Device>

The vehicle moving speed detection device 51 is a device which detects the own vehicle moving speed, i.e., the moving speed of the own vehicle 100. The vehicle moving speed detection device 51 may include vehicle wheel rotation speed sensors. The vehicle moving speed detection device 51 is electrically connected to the ECU 90. The vehicle moving speed detection device 51 sends information on the detected moving speed of the own vehicle 100 to the ECU 90. The ECU 90 acquires the moving speed of the own vehicle 100 as the own vehicle moving speed Vego, based on the information sent from the vehicle moving speed detection device 51.

The ECU 90 calculates and acquires a requested steering torque, based on the steering angle θ, the driver input torque TQdr, and the own vehicle moving speed Vego. The requested steering torque is the steering torque requested for the steering apparatus 23 to output. The ECU 90 controls the operations of the steering apparatus 23 so as to output the steering torque corresponding to the requested steering torque.

<Longitudinal Acceleration Sensor>

The longitudinal acceleration sensor 52 is a sensor which detects an acceleration of the own vehicle 100 in a longitudinal direction of the own vehicle 100. The longitudinal acceleration sensor 52 is electrically connected to the ECU 90. The longitudinal acceleration sensor 52 sends information on the detected acceleration to the ECU 90. The ECU 90 acquires the acceleration of the own vehicle 100 in the longitudinal direction of the own vehicle 100 as a longitudinal acceleration Gx, based on the information sent from the longitudinal acceleration sensor 52.

<Lateral Acceleration Sensor>

The lateral acceleration sensor 53 is a sensor which detects an acceleration of the own vehicle 100 in a lateral or width direction of the own vehicle 100. The lateral acceleration sensor 53 is electrically connected to the ECU 90. The lateral acceleration sensor 53 sends information on the detected acceleration to the ECU 90. The ECU 90 acquires the acceleration of the own vehicle 100 in the lateral or width direction of the own vehicle 100 as a lateral acceleration Gy, based on the information sent from the lateral acceleration sensor 53.

<Yaw Rate Sensor>

The yaw rate sensor 54 is a sensor which detects a yaw rate of the own vehicle 100. The yaw rate sensor 54 is electrically connected to the ECU 90. The yaw rate sensor 54 sends information on the detected yaw rate to the ECU 90. The ECU 90 acquires the yaw rate of the own vehicle 100 as an own vehicle yaw rate ω, based on the information sent from the yaw rate sensor 54.

<Surrounding Information Detection Apparatus>

The surrounding information detection apparatus 60 is an apparatus which detects information on a situation around the own vehicle 100. In this embodiment, the surrounding information detection apparatus 60 includes radio wave sensors 61 and image sensors 62. The radio wave sensor 61 may be a radar sensor such as a millimeter wave radar. The image sensor 62 may be a camera. It should be noted that the surrounding information detection apparatus 60 may include sonic wave sensors such as ultrasonic wave sensors such as clearance sonars and optical sensors such as laser radars such as LiDAR.

<Radio Wave Sensors>

The radio wave sensors 61 are electrically connected to the ECU 90. The radio wave sensor 61 transmits radio waves and receives reflected waves, i.e., the radio waves reflected by objects such as vehicles and persons. The radio wave sensor 61 sends detection results, i.e., information on the transmitted radio waves and the received reflected waves to the ECU 90. In other words, the radio wave sensor 61 detects objects around the own vehicle 100 and sends the detection results, i.e., the information on the detected objects. The ECU 90 can acquire the information on the objects around the own vehicle 100 as surrounding detection information INF_S, based on the information or radio wave information sent from the radio wave sensors 61.

<Image Sensors>

The image sensors 62 are electrically connected to the ECU 90. The image sensor 62 takes images of a view around the own vehicle 100 and sends information on the taken images to the ECU 90. The ECU 90 can acquire the information on the surroundings of the own vehicle 100 as the surrounding detection information INF_S, based on the information or image information sent from the image sensors 62.

<Summary of Operations of Vehicle Collision Avoidance Assist Apparatus>

Next, a summary of operations of the vehicle collision avoidance assist apparatus 10 will be described.

The vehicle collision avoidance assist apparatus 10 executes a collision avoidance control to control the operations of the driving apparatus 21 and the braking apparatus 22 when (i) the own vehicle 100 turns, (ii) a collision avoidance forbiddance condition described later in detail is not satisfied, and (iii) a collision condition is satisfied. The collision avoidance control is a control for avoiding a collision of the own vehicle 100 with the object. The collision avoidance forbiddance condition is a predetermined condition on a steered state of the own vehicle 100. The collision condition is a condition that the own vehicle 100 has a probability to collide with the object ahead of the own vehicle 100. On the other hand, the vehicle collision avoidance assist apparatus 10 does not execute the collision avoidance control when (i) the own vehicle 100 turns, (ii) the collision avoidance forbiddance condition is satisfied, and (iii) the collision condition is satisfied. It should be noted that in this embodiment, the vehicle collision avoidance assist apparatus 10 is configured to execute an ordinary moving control when the vehicle collision avoidance assist apparatus 10 does not the collision avoidance control.

<Ordinary Moving Control>

The ordinary moving control is a control to control the operations of the driving apparatus 21 and the braking apparatus 22, depending on operations applied to the accelerator pedal 31 and the brake pedal 33 by the driver DR. In particular, the ordinary moving control is the control to control the operations of the driving apparatus 21 so as to output the driving torque corresponding to the requested driving torque or the driving force corresponding to the requested driving force which is set, based on the accelerator pedal operation amount AP when the accelerator pedal operation amount AP is greater than zero. In addition, the ordinary moving control is the control to control the operations of the braking apparatus 22 so as to output the braking torque corresponding to the requested braking torque or the braking force corresponding to the requested braking force which is set, based on the brake pedal operation amount BP when the brake pedal operation amount BP is greater than zero.

<Collision Avoidance Control>

The collision avoidance control is a control to forcibly brake the own vehicle 100 to stop the own vehicle 100 independently of the operations of the accelerator pedal 31 and the brake pedal 33 applied by the driver DR to avoid the own vehicle 100 from colliding with the object such as a pedestrian walking across a road which the own vehicle 100 turning right or left reaches, in particular, a pedestrian walking along a sidewalk or a pedestrian crossing provided on the road which the own vehicle 100 turning right or left reaches when the own vehicle 100 turns right or left at a traffic intersection. Below, the collision avoidance control will be described in detail.

The vehicle collision avoidance assist apparatus 10 determines whether the own vehicle 100 turns, based on the steering angle θ while the vehicle collision avoidance assist apparatus 10 is activated. When the steering angle θ is greater than zero, the vehicle collision avoidance assist apparatus 10 determines that the own vehicle 100 turns right. On the other hand, when the steering angle θ is smaller than zero, the vehicle collision avoidance assist apparatus 10 determines that the own vehicle 100 turns left. When the steering angle θ is greater or smaller than zero, the vehicle collision avoidance assist apparatus 10 determines that the own vehicle 100 turns, and thus an own vehicle turning condition C1 is satisfied.

In addition, the vehicle collision avoidance assist apparatus 10 executes an object detection process while the vehicle collision avoidance assist apparatus 10 is activated. The object detection process is a process to detect the object ahead of the own vehicle 100, based on the surrounding detection information INF_S.

Figure 2:
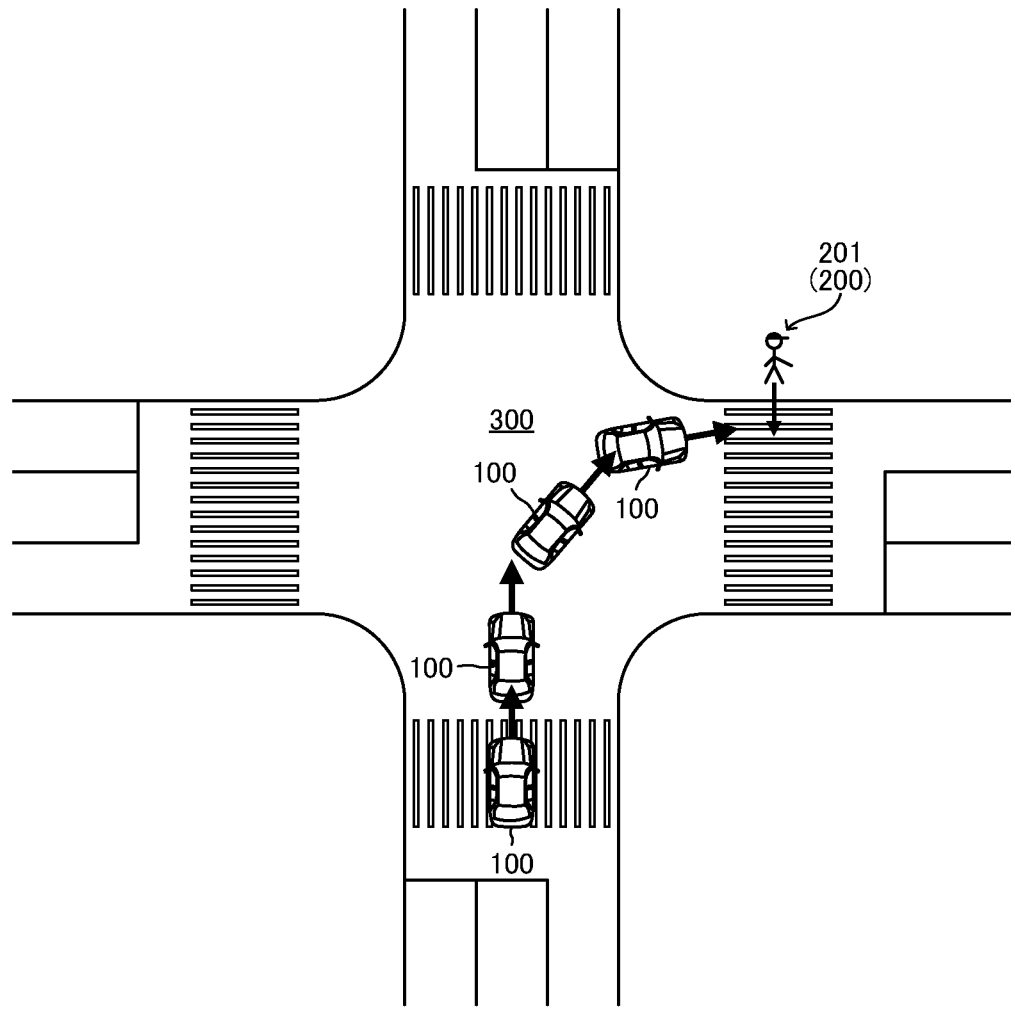
FIG. 2 is a view which shows a scene that the own vehicle turns right at a traffic intersection.
Figure 3:
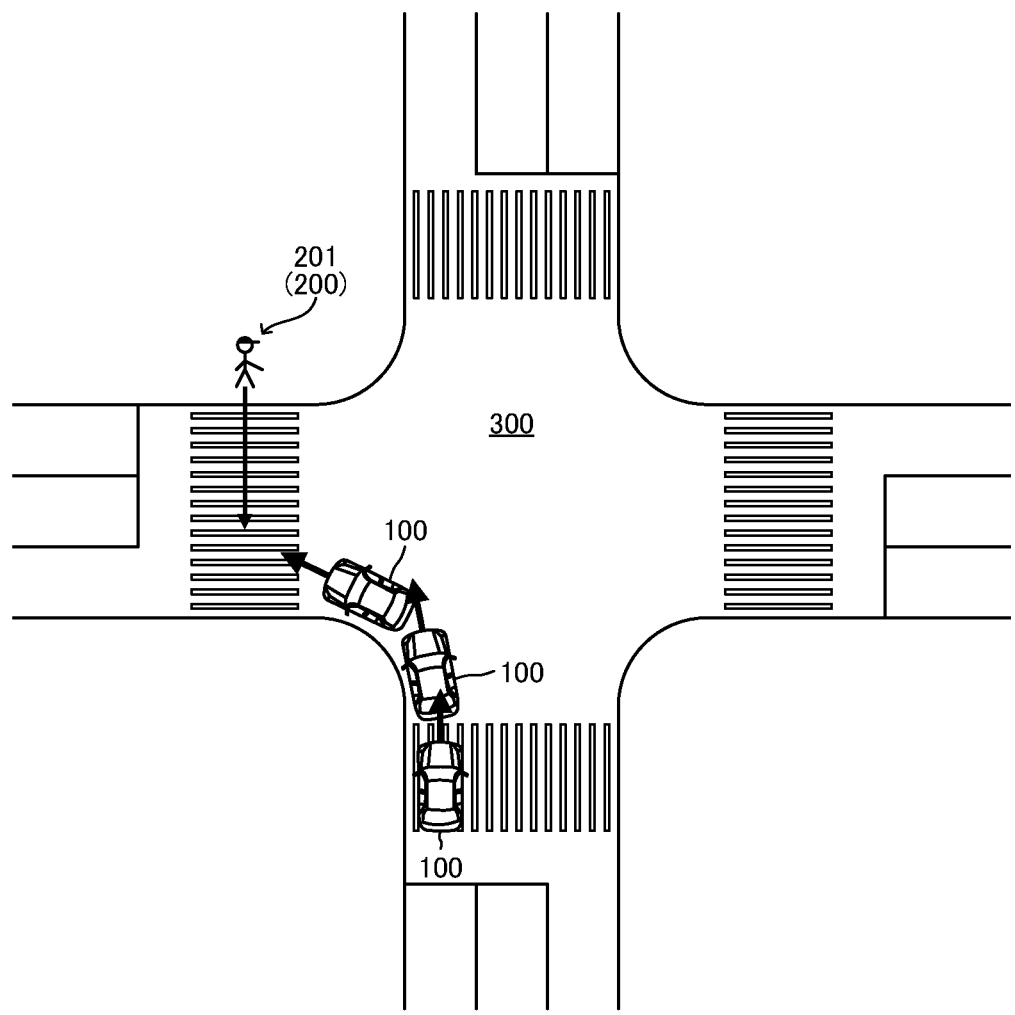
FIG. 3 is a view which shows a scene that the own vehicle turns left at the traffic intersection.

For example, as shown in FIG. 2, when the own vehicle 100 turns right at a traffic intersection 300, and there is a pedestrian 201 walking along the crosswalk or the pedestrian crossing ahead of the own vehicle 100, the vehicle collision avoidance assist apparatus 10 detects the pedestrian 201 as the object by the object detection process. Similarly, as shown in FIG. 3, when the own vehicle 100 turns left at the traffic intersection 300, and there is the pedestrian 201 walking along the crosswalk or the pedestrian crossing ahead of the own vehicle 100, the vehicle collision avoidance assist apparatus 10 detects the pedestrian 201 as the object by the object detection process.

When the own vehicle turning condition C1 is satisfied, i.e., the own vehicle 100 turns, and the vehicle collision avoidance assist apparatus 10 detects the object ahead of the own vehicle 100, the own vehicle 100 executes a collision determination process to determine whether the own vehicle 100 is going to collide with the detected object 200. The collision determination process has processes described below.

First, the vehicle collision avoidance assist apparatus 10 acquires a moving speed of the detected object 200 at a current time tnow as an object ground speed Vtgt, based on the surrounding detection information INF_S and acquires an object ground speed X-component Vtgt_x and an object ground speed Y-component Vtgt_y by a calculation using formulas (1) and (2) described below, based on the object ground speed Vtgt.

$$Vtgt\_x = Vtgt \cdot \sin\theta \qquad (1)$$

$$Vtgt\_y = Vtgt \cdot \cos\theta \qquad (2)$$

The object ground speed X-component Vtgt_x is an X-axis component of the object ground speed Vtgt of the current time tnow on an own vehicle coordinate system CS of the current time tnow. The object ground speed Y-component Vtgt_y is a Y-axis component of the object ground speed Vtgt of the current time tnow on the own vehicle coordinate system CS of the current time tnow.

Figure 4:
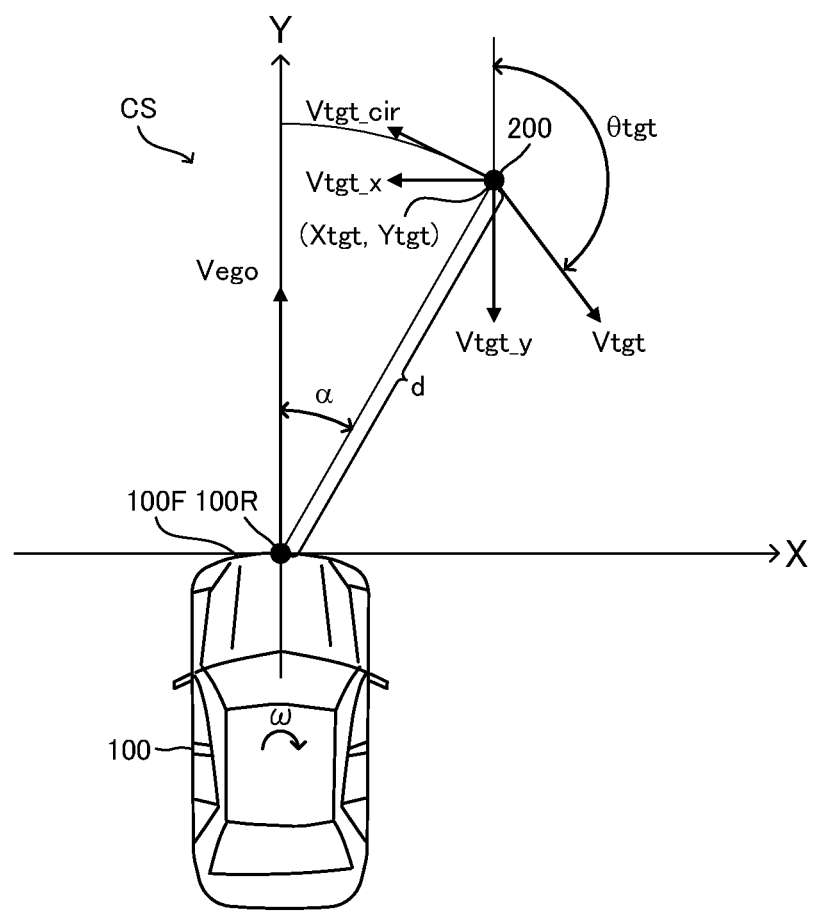
FIG. 4 is a view which shows an object speed, etc. on an own vehicle coordinate system.

As shown in FIG. 4, the own vehicle coordinate system CS is a coordinate system which is defined by (i) an origin corresponding to an own vehicle reference point 100R, (ii) an X-axis along the width direction of the own vehicle 100, and (iii) a Y-axis along the longitudinal direction of the own vehicle 100. The own vehicle 100 R is a center point of a front edge 100F of the own vehicle 100 in the width direction of the own vehicle 100. As can be understood from FIG. 4, on the own vehicle coordinate system CS, values at the right side of the origin (i.e., the own vehicle reference point 100R) or rightward with respect to the origin take positive values, and values at the left side of the origin (i.e., the own vehicle reference point 100R) or leftward with respect to the origin take negative values.

Further, the vehicle collision avoidance assist apparatus 10 acquires an own vehicle moving speed X-component Vego_x and an own vehicle moving speed Y-component Vego_y by a calculation using formulas (3) and (4) described below, based on the own vehicle moving speed Vego of the current time tnow.

$$Vego\_x = 0 \qquad (3)$$

$$Vego\_y = -Vego \qquad (4)$$

The own vehicle moving speed X-component Vego_x is an X-axis component of the own vehicle moving speed Vego of the current time tnow on the own vehicle coordinate system CS of the current time tnow. The own vehicle moving speed Y-component Vego_y is a Y-axis component of the own vehicle moving speed Vego of the current time tnow on the own vehicle coordinate system CS of the current time tnow.

Further, the vehicle collision avoidance assist apparatus 10 acquires an object X-coordinate Xtgt of the current time tnow and an object Y-coordinate Ytgt of the current time tnow, based on the surrounding detection information INF_S and acquires an object orientation angle α and an object distance d by a calculation using formulas (5) and (6) described below, based on the object X-coordinate Xtgt and the object Y-coordinate Ytgt.

$$\alpha = \mathrm{atan2}(Xtgt, Ytgt) \qquad (5)$$

$$d = \sqrt{(Xtgt^2 + Ytgt^2)} \qquad (6)$$

The object X-coordinate Xtgt is an X-coordinate of the detected object 200 of the current time tnow on the own vehicle coordinate system CS of the current time tnow. Thus, the object X-coordinate Xtgt represents a position of the detected object 200 of the current time tnow in the width direction of the own vehicle 100 with respect to the own vehicle reference point 100R of the current time tnow.

The object Y-coordinate Ytgt is a Y-coordinate of the detected object 200 on the own vehicle coordinate system CS of the current time tnow. Thus, the object X-coordinate Xtgt represents a position of the detected object 200 of the current time tnow in the longitudinal direction of the own vehicle 100 with respect to the own vehicle reference point 100R of the current time tnow.

The object orientation angle α is an angle defined by the Y-axis and a line connecting the own vehicle reference point 100R of the current time tnow and the detected object 200 of the current time tnow on the own vehicle coordinate system CS of the current time tnow. Thus, the object orientation angle α represents an orientation of the detected object 200 of the current time tnow with respect to the own vehicle reference point 100R of the current time tnow.

The object distance d is a distance between the own vehicle reference point 100R of the current time tnow and the detected object 200 of the current time tnow on the own vehicle coordinate system CS of the current time tnow. Thus, the object distance d represents the distance between the own vehicle reference point 100R of the current time tnow and the detected object 200 of the current time tnow.

Then, the vehicle collision avoidance assist apparatus 10 acquires an object ground peripheral speed Vtgt_cir by a calculation using a formula (7) described below, based on the acquired object distance d of the current time tnow and the acquired own vehicle yaw rate ω of the current time tnow.

$$Vtgt\_cir = -d \cdot \omega \quad (7)$$

The object ground peripheral speed Vtgt_cir is a moving speed of the detected object 200 of the current time tnow along a circular arc about the own vehicle reference point 100R of the current time tnow.

Further, the vehicle collision avoidance assist apparatus 10 acquires an object ground peripheral speed X-component Vtgt_cir_x and an object ground peripheral speed Y-component Vtgt_cir_y by a calculation using formulas (8) and (9) described below, based on the acquired object ground peripheral speed Vtgt_cir of the current time tnow and the acquired object orientation angle α of the current time tnow.

$$Vtgt\_cir\_x = Vtgt\_cir \cdot \cos\alpha \quad (8)$$

$$Vtgt\_cir\_y = -Vtgt\_cir \cdot \sin\alpha \quad (9)$$

The object ground peripheral speed X-component Vtgt_cir_x is an X-coordinate component of the object ground peripheral speed Vtgt_cir of the current time tnow on the own vehicle coordinate system CS of the current time tnow. The object ground peripheral speed Y-component Vtgt_cir_y is a Y-coordinate component of the object ground peripheral speed Vtgt_cir of the current time tnow on the own vehicle coordinate system CS of the current time tnow.

Then, the vehicle collision avoidance assist apparatus 10 acquires an object relative speed X-component Vtgt_rel_x by a calculation using a formula (10) described below, based on the acquired object ground speed X-component Vtgt_x, the acquired own vehicle moving speed X-component Vego_x, and the acquired object ground peripheral speed X-component Vtgt_cir_x. In addition, the vehicle collision avoidance assist apparatus 10 acquires an object relative speed Y-component Vtgt_rel_y by a calculation using a formula (11) described below, based on the acquired object ground speed Y-component Vtgt_y, the acquired own vehicle moving speed Y-component Vego_y and the acquired object ground peripheral speed Y-component Vtgt_cir_y.

$$Vtgt\_rel\_x = Vtgt\_x + Vego\_x + Vtgt\_cir\_x \quad (10)$$

$$Vtgt\_rel\_y = Vtgt\_y + Vego\_y + Vtgt\_cir\_y \quad (11)$$

The object relative speed X-component Vtgt_rel_x is an X-axis component of the moving speed of the detected object 200 of the current time tnow on the own vehicle coordinate system CS of the current time tnow. Thus, the object relative speed X-component Vtgt_rel_x is a relative speed of the detected object 200 of the current time tnow with respect to the own vehicle reference point 100R of the current time tnow in the width direction of the own vehicle 100.

The object relative speed Y-component Vtgt_rel_y is a Y-axis component of the moving speed of the detected object 200 of the current time tnow on the own vehicle coordinate system CS of the current time tnow. Thus, the object relative speed Y-component Vtgt_rel_y is a relative speed of the detected object 200 of the current time tnow with respect to the own vehicle reference point 100R of the current time tnow in the longitudinal direction of the own vehicle 100.

Then, the vehicle collision avoidance assist apparatus 10 acquires an object crossing angle θtgt by a calculation using a formula (12) described below, based on the acquired object relative speed X-component Vtgt_rel_x and the acquired object relative speed Y-component Vtgt_rel_y.

$$\theta tgt = atan2(Vtgt\_rel\_x, Vtgt\_rel\_y) \quad (12)$$

The object crossing angle θtgt is an angle defined by a speed vector of the detected object 200 of the current time tnow and a speed vector of the own vehicle 100 of the current time tnow.

In addition, the vehicle collision avoidance assist apparatus 10 acquires an object relative speed Vtgt_rel by a calculation using a formula (13) described below, based on the acquired object relative speed X-component Vtgt_rel_x and the acquired object relative speed Y-component Vtgt_rel_y.

$$Vtgt\_rel = \sqrt{(Vtgt\_rel\_x^2 + Vtgt\_rel\_y^2)} \quad (13)$$

The object relative speed Vtgt_rel is a relative speed of the detected object 200 of the current time tnow on the own vehicle coordinate system CS of the current time tnow. Thus, the object relative speed Vtgt_rel is a relative speed of the detected object 200 of the current time tnow with respect to the own vehicle reference point 100R of the current time tnow.

<Predicted Turning Route>

Then, the vehicle collision avoidance assist apparatus 10 acquires a route along which the own vehicle 100 is predicted to move as a predicted turning route RTego. In particular, the vehicle collision avoidance assist apparatus 10 acquires a turning radius R by a calculation using a formula (14) described below, based on the own vehicle moving speed Vego of the current time tnow and the own vehicle yaw rate ω of the current time tnow. Then, the vehicle collision avoidance assist apparatus 10 acquires an X-coordinate of the own vehicle reference point 100R of each time t after the current time tnow as a predicted own vehicle X-coordinate Xego_cal by a calculation using a formula (15) described below, based on the acquired turning radius R and the own vehicle yaw rate ω of the current time tnow. In addition, the vehicle collision avoidance assist apparatus 10 acquires a Y-coordinate of the own vehicle reference point 100R of each time t after the current time tnow as a predicted own vehicle Y-coordinate Yego_cal by a calculation using a formula (16) described below, based on the acquired turning radius R and the own vehicle yaw rate ω of the current time tnow.

$$R = \text{Vego}/\omega \tag{14}$$

$$\text{Xego\_cal} = R - R \cdot \cos\omega t \tag{15}$$

$$\text{Yego\_cal} = R \cdot \sin\omega t \tag{16}$$

Each time t after the current time tnow is a time after an integral multiple of a predetermined time, i.e., a calculation cycle Δt from the current time tnow.

The predicted own vehicle X-coordinate Xego_cal is an X-coordinate of the own vehicle 100 of the time t after the current time tnow on the own vehicle coordinate system CS of the current time tnow. Thus, the predicted own vehicle X-coordinate Xego_cal represents the position of the own vehicle reference point 100R of the time t after the current time tnow in the width direction of the own vehicle 100 with respect to the own vehicle reference point 100R of the current time tnow.

The predicted own vehicle Y-coordinate Yego_cal is a Y-coordinate of the own vehicle 100 of the time t after the current time tnow on the own vehicle coordinate system CS of the current time tnow. Thus, the predicted own vehicle Y-coordinate Yego_cal represents the position of the own vehicle reference point 100R of the time t after the current time tnow in the longitudinal direction of the own vehicle 100 with respect to the own vehicle reference point 100R of the current time tnow.

The vehicle collision avoidance assist apparatus 10 acquires a line connecting coordinate points defined by the acquired predicted own vehicle X-coordinate Xego_cal and the acquired predicted own vehicle Y-coordinate Yego_cal as the predicted turning route RTego.

<Predicted Moving Route>

In addition, the vehicle collision avoidance assist apparatus 10 acquires a route along which the detected object 200 is predicted to move as a predicted moving route RTtgt. In particular, the vehicle collision avoidance assist apparatus 10 acquires an X-coordinate of the detected object 200 of each time t after the current time tnow as a predicted object X-coordinate Xtgt_cal by a calculation using a formula (17) described below, based on the object ground speed Vtgt of the current time tnow, the object crossing angle θtgt of the current time tnow, and the object X-coordinate Xtgt of the current time tnow. In addition, the vehicle collision avoidance assist apparatus 10 acquires a Y-coordinate of the detected object 200 of each time t after the current time tnow as a predicted object Y-coordinate Ytgt_cal by a calculation using a formula (18) described below, based on the object ground speed Vtgt of the current time tnow, the object crossing angle θtgt of the current time tnow, and the object Y-coordinate Ytgt of the current time tnow.

$$\text{Xtgt\_cal} = \text{Vtgt} \cdot t \cdot \sin\theta + \text{Xtgt} \tag{17}$$

$$\text{Ytgt\_cal} = \text{Vtgt} \cdot t \cdot \cos\theta + \text{Ytgt} \tag{18}$$

The predicted object X-coordinate Xtgt_cal is an X-coordinate of the detected object 200 of the time t after the current time tnow on the own vehicle coordinate system CS of the current time tnow. Thus, the predicted object X-coordinate Xtgt_cal represents the position of the detected object 200 of the time t after the current time tnow in the width direction of the own vehicle 100 with respect to the own vehicle reference point 100R of the current time tnow.

The predicted object Y-coordinate Ytgt_cal is a Y-coordinate of the detected object 200 of the time t after the current time tnow on the own vehicle coordinate system CS of the current time tnow. Thus, the predicted object X-coordinate Xtgt_cal represents the position of the detected object 200 of the time t after the current time tnow in the longitudinal direction of the own vehicle 100 with respect to the own vehicle reference point 100R of the current time tnow.

The vehicle collision avoidance assist apparatus 10 acquires a line connecting coordinate points defined by the acquired predicted object X-coordinate Xtgt_cal and the acquired predicted object Y-coordinate Ytgt_cal as the predicted moving route RTtgt.

When the predicted turning route RTego crosses the predicted moving route RTtgt on the own vehicle coordinate system CS of the current time tnow, the vehicle collision avoidance assist apparatus 10 determines whether the own vehicle 100 is going to collide with the detected object 200 by executing processes described below.

That is, the vehicle collision avoidance assist apparatus 10 calculates and acquires a predicted reaching time TTC. The predicted reaching time TTC is a time taken for the own vehicle reference point 100R to reach the predicted moving route RTtgt assuming that the own vehicle 100 moves, keeping its moving state of the current time tnow. For example, the vehicle collision avoidance assist apparatus 10 calculates the predicted reaching time TTC by dividing a distance which the own vehicle 100 moves to the predicted moving route RTtgt by the own vehicle moving speed Vego of the current time tnow.

Then, the vehicle collision avoidance assist apparatus 10 determines whether the acquired predicted reaching time TTC is smaller than a predetermined predicted reaching time TTCth.

When the predicted reaching time TTC becomes smaller than the predetermined predicted reaching time TTCth, the vehicle collision avoidance assist apparatus 10 acquires an X-axis direction object distance dtgt_x and a Y-axis direction object distance dtgt_y of each time t after the current time tnow by a calculation using formulas (19) and 20 described below, based on the object relative speed Vtgt_rel, the object crossing angle θtgt, the object X-coordinate Xtgt, the object Y-coordinate Ytgt, the turning radius R, and the own vehicle yaw rate ω of the current time tnow.

$$\text{dtgt\_x} = (\text{Vtgt} \cdot t \cdot \sin\theta + \text{Xtgt} - (R - R \cdot \cos\omega t)) \cdot \cos\omega t - (\text{Vtgt} \cdot t \cdot \cos\theta + \text{Ytgt} - R \cdot \sin\omega t) \cdot \sin\omega t \tag{19}$$

$$\text{dtgt\_y} = (\text{Vtgt} \cdot t \cdot \sin\theta + \text{Xtgt} - (R - R \cdot \cos\omega t)) \cdot \sin\omega t + (\text{Vtgt} \cdot t \cdot \cos\theta + \text{Ytgt} - R \cdot \sin\omega t) \cdot \cos\omega t \tag{20}$$

The X-axis direction object distance dtgt_x is a distance in the X-axis direction between the detected object 200 of the time t and the own vehicle reference point 100R of the time t on the own vehicle coordinate system CS of the time t. Thus, the X-axis direction object distance dtgt_x represents a distance in the width direction of the own vehicle 100 between the detected object 200 of the time t and the own vehicle reference point 100R of the time t.

The Y-axis direction object distance dtgt_y is a distance in the Y-axis direction between the detected object 200 of the time t and the own vehicle reference point 100R of the time t on the own vehicle coordinate system CS of the time t. Thus, the Y-axis direction object distance dtgt_y represents a distance in the longitudinal direction of the own vehicle 100 between the detected object 200 of the time t and the own vehicle reference point 100R of the time t.

Figure 5:
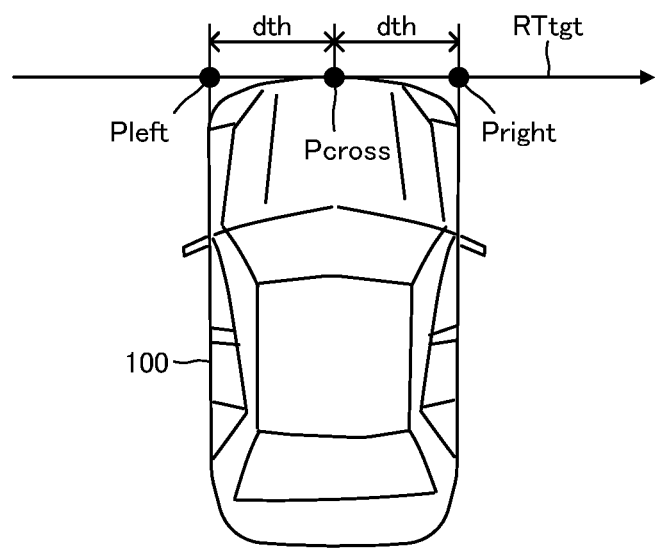
FIG. 5 is a view which shows a collision area.

Then, the vehicle collision avoidance assist apparatus 10 predicts an object position corresponding to a position of the detected object 200 at the time when the own vehicle reference point 100R reaches a crossing point Pcross where the predicted turning route RTego crosses the predicted moving route RTtgt. In other words, the vehicle collision avoidance assist apparatus 10 predicts the position of the detected object 200 with respect to the own vehicle reference point 100R at the time when the own vehicle reference point 100R reaches the predicted moving route RTtgt. Then, the vehicle collision avoidance assist apparatus 10 determines whether the predicted position of the detected object 200 is in a collision area RGcol. As shown in FIG. 5, the collision area RGcol is an area between a point Pleft and a point right. The point Pleft is a point separated from the crossing point Pcross by a predetermined distance dth in one direction along the predicted moving route RTtgt. The point Pright is a point separated from the crossing point Pcross by the predetermined distance dth in the other direction along the predicted moving route RTtgt. Further, the predetermined distance dth corresponds to one half of a width of the own vehicle 100.

In this embodiment, the vehicle collision avoidance assist apparatus 10 determines whether the predicted position of the detected object 200 is in the collision area RGcol by determining whether the X-axis direction object distance dtgt_x is equal to or smaller than the predetermined distance dth at the time t when the Y-axis direction object distance dtgt_y decreases to zero.

When the position of the detected object 200 is in the collision area RGcol, the vehicle collision avoidance assist apparatus 10 determines that the own vehicle 100 is going to collide with the detected object 200, and thus the collision condition C2 becomes satisfied. In this embodiment, when the X-axis direction object distance dtgt_x is equal to or smaller than the predetermined distance dth at the time t when the Y-axis direction object distance dtgt_y decreases to zero, the vehicle collision avoidance assist apparatus 10 determines that the own vehicle 100 is going to collide with the detected object 200.

When the X-axis direction object distance dtgt_x is equal to or smaller than the predetermined distance dth at the time t when the Y-axis direction object distance dtgt_y decreases to zero, the vehicle collision avoidance assist apparatus 10 determines that the collision condition C2 becomes satisfied. That is, when the predicted reaching time TTC is equal to or smaller than the predetermined predicted reaching time TTCth, and the X-axis direction object distance dtgt_x is equal to or smaller than the predetermined distance dth at the time t when the Y-axis direction object distance dtgt_y decreases to zero, the vehicle collision avoidance assist apparatus 10 determines that the collision condition C2 becomes satisfied. When the vehicle collision avoidance assist apparatus 10 determines that the collision condition C2 becomes satisfied, the vehicle collision avoidance assist apparatus 10 starts to execute the collision avoidance control as far as a collision avoidance forbiddance condition C3 is not satisfied.

While the vehicle collision avoidance assist apparatus 10 executes the collision avoidance control, the vehicle collision avoidance assist apparatus 10 controls the operations of the driving apparatus 21 so as to make the driving force applied to the own vehicle 100 zero and controls the operations of the braking apparatus 22 so as to apply the driving force corresponding to a predetermined driving force to the own vehicle 100. The predetermined braking force is set to a value which can stop the own vehicle 100 before the predicted moving route RTtgt.

<Collision Avoidance Forbiddance Condition>

When the own vehicle 100 turns right, the steering angle of the own vehicle 100 gradually increases during a period of time between a time of starting to turn right and the middle of the turning right of the own vehicle 100. Then, the steering angle of the own vehicle 100 gradually decreases after the middle of the turning right of the own vehicle 100. When the own vehicle 100 completes turning right, the steering angle of the own vehicle 100 is zero. Thus, in general, a turning radius of an actual turning route RTact along which the own vehicle 100 actually moves while turning right, gradually decreases during the period of time between the time of starting turning right and the middle of the turning right of the own vehicle 100. Then, the turning radius of the actual turning route RTact gradually increases after the middle of the turning right of the own vehicle 100. After the own vehicle 100 completes turning right, the turning radius of the actual turning route RTact is infinite. That is, after the own vehicle 100 completes turning right, the own vehicle 100 moves straight.

Figure 6:
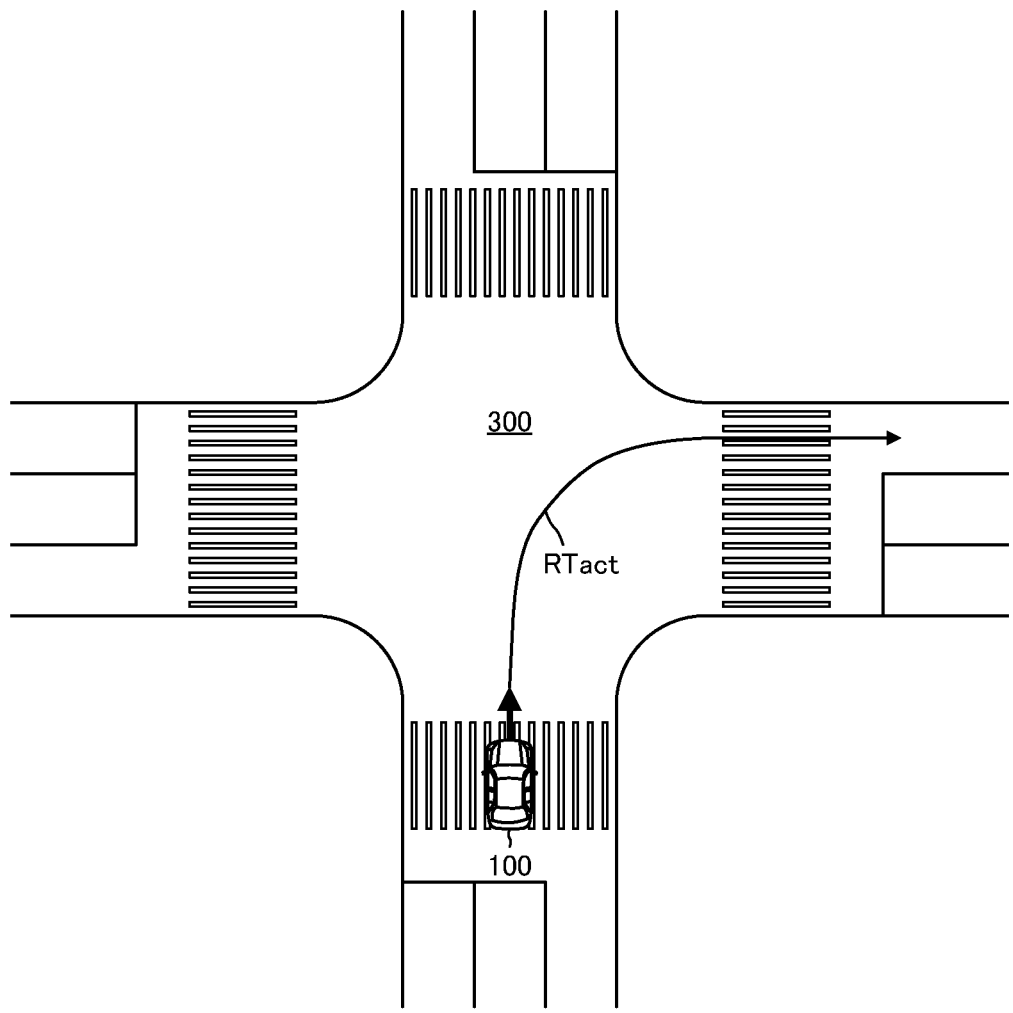
FIG. 6 is a view which shows an actual turning route of the own vehicle turning right.

Thus, the actual turning route RTact is a straight route as shown in FIG. 6 after the own vehicle 100 completes turning right.

Figure 8:
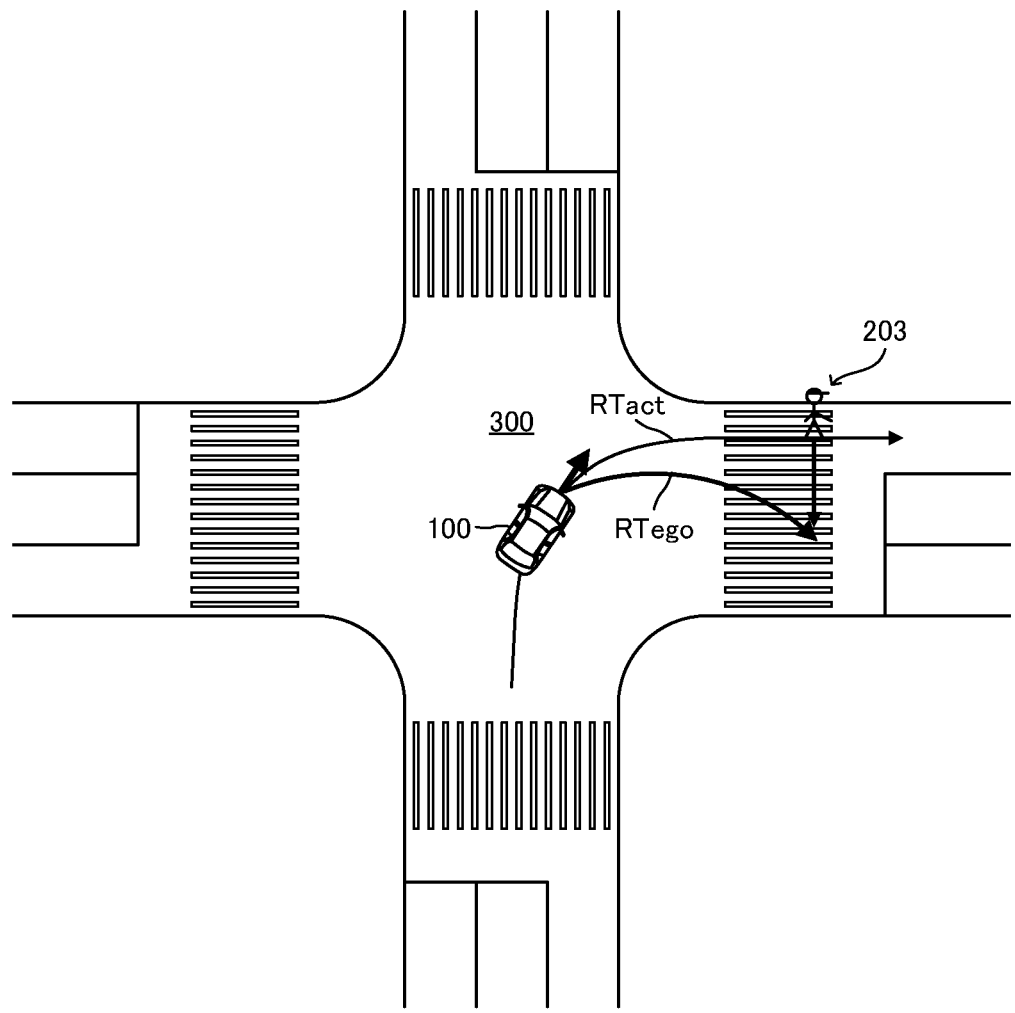
FIG. 8 is a view which shows the actual turning route and the predicted turning route at the middle of turning right of the own vehicle after the own vehicle starts to turn right.
Figure 9:
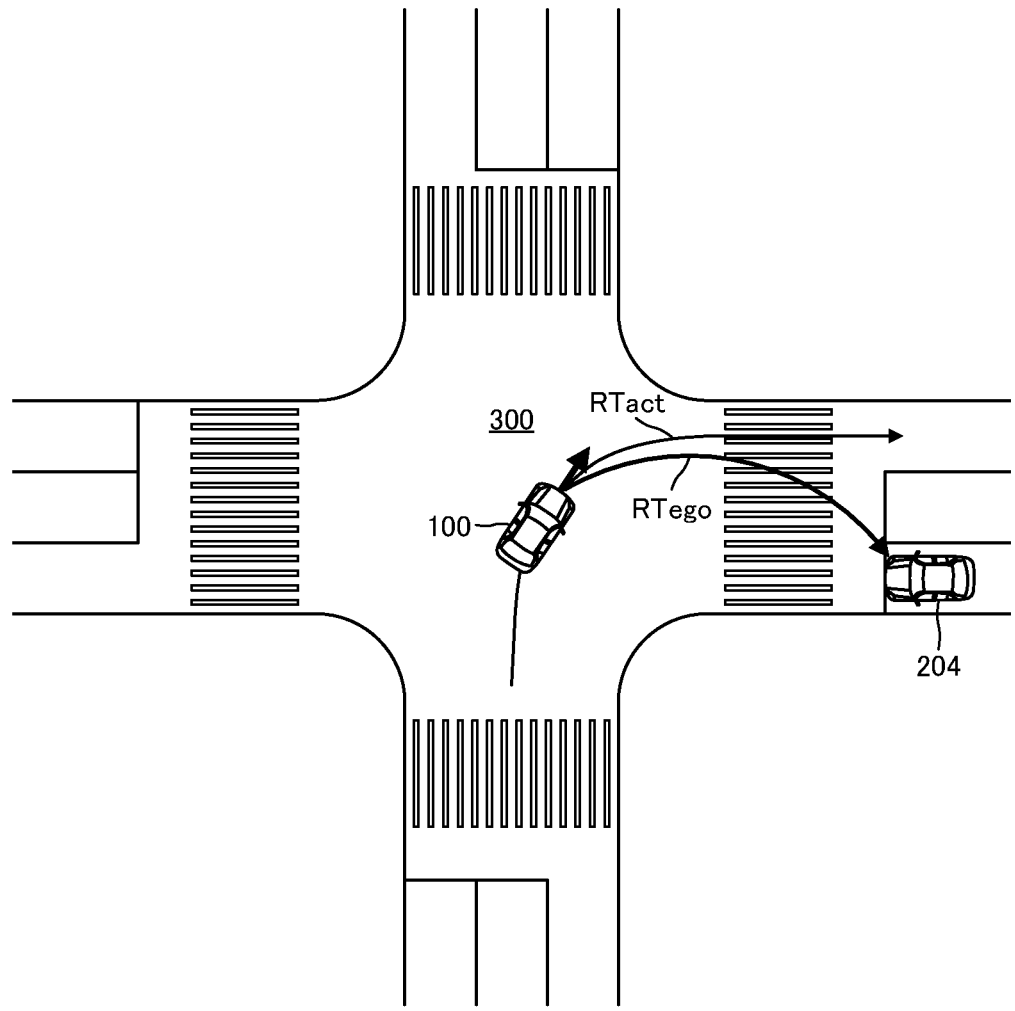
FIG. 9 is a view which shows the actual turning route and the predicted turning route at the middle of the turning right of the own vehicle after the own vehicle starts to turn right.

On the other hand, as described above, in this embodiment, the vehicle collision avoidance assist apparatus 10 acquires the predicted turning route RTego, using the own vehicle yaw rate ω of the current time tnow. Thus, for example, as shown in FIG. 6, before the middle of the turning right of the own vehicle 100, the acquired predicted turning route RTego passes the left side of the actual turning route RTact in the road which the own vehicle 100 turning right reaches. That is, the predicted turning route RTego tends to deviate from the actual turning route RTact. Further, as shown in FIG. 8 and FIG. 9, at the middle of the turning right of the own vehicle 100, the acquired predicted turning route RTego passes the right side of the actual turning route RTact in the road which the own vehicle 100 turning right reaches. That is, the predicted turning route RTego tends to deviate from the actual turning route RTact.

Figure 7:
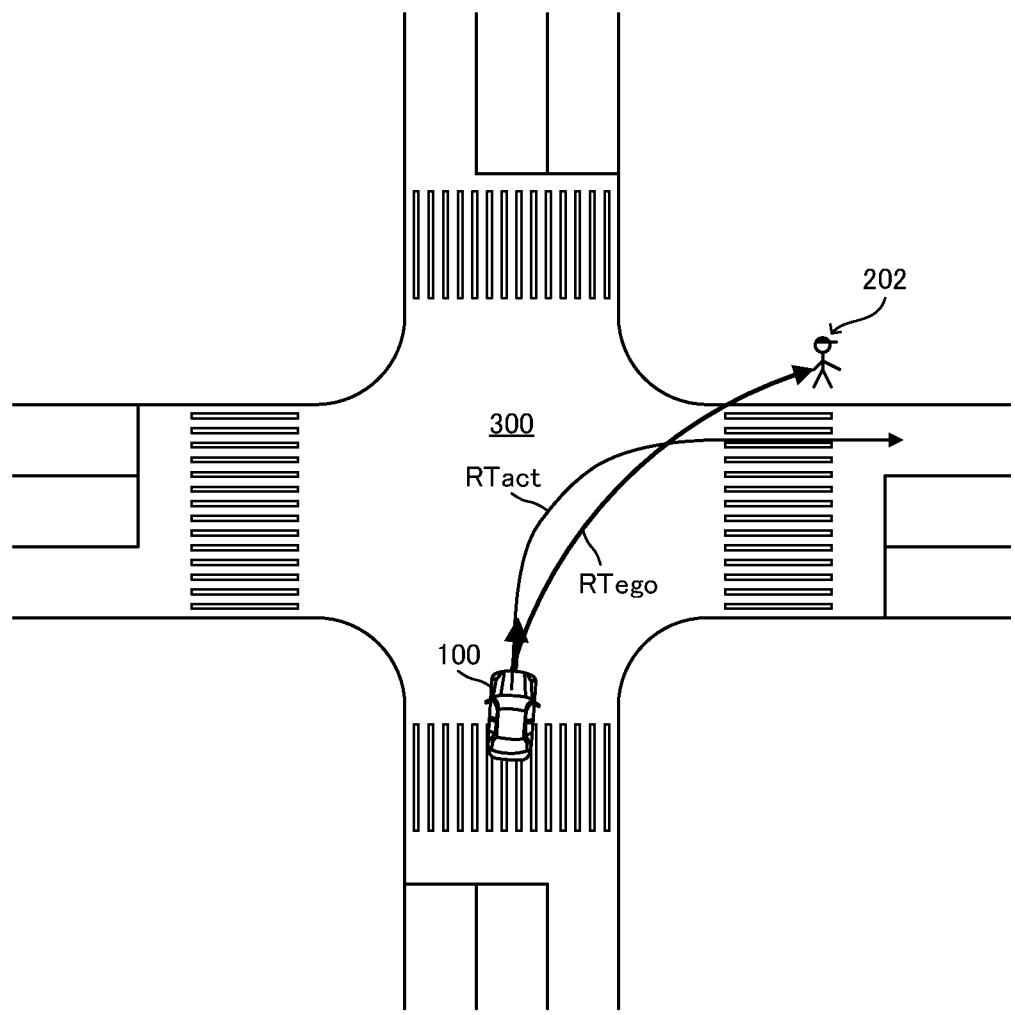
FIG. 7 is a view which shows the actual turning route and a predicted turning route immediately after the own vehicle starts to turn right.

Thus, as shown in FIG. 7, when the predicted turning route RTego passes the left side of the actual turning route RTact in the road which the own vehicle 100 turning right reaches, and the collision condition C2 is even satisfied for a person 202 on a sidewalk or a pavement in the road which the own vehicle 100 turning right reaches, the own vehicle 100 does not collide with the person 202 as far as the own vehicle 100 normally turns right. An execution of the collision avoidance control in such a situation is unnecessary.

Further, as shown in FIG. 8, when the predicted turning route RTego passes the right side of the actual turning route RTact in the road which the own vehicle 100 turning right reaches, and the collision condition C2 is even satisfied for a pedestrian 203 walking along the crosswalk or the pedestrian crossing in the road which the own vehicle 100 turning right reaches, the own vehicle 100 may pass by the pedestrian 203. Furthermore, as shown in FIG. 9, when the predicted turning route RTego passes the right side of the actual turning route RTact in the road which the own vehicle 100 turning right reaches, the collision condition C2 may be satisfied for an oncoming vehicle 204 stopped in an oncoming lane in the road which the own vehicle 100 turning right reaches. Even in this case, the own vehicle 100 does not collide with the oncoming vehicle 204 as far as the own vehicle 100 normally turns right. The execution of the collision avoidance control in such a situation is unnecessary.

Figure 10:
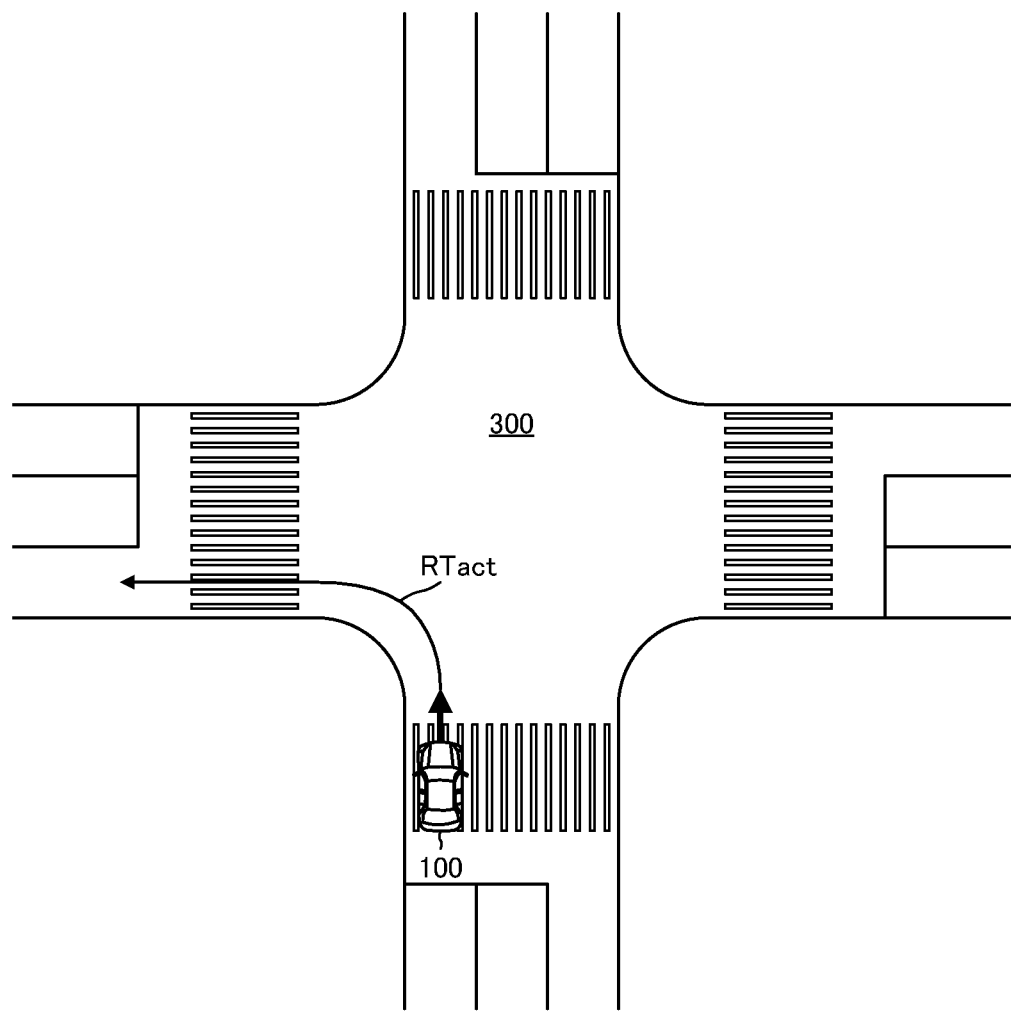
FIG. 10 is a view which shows the actual turning route of the own vehicle turning left.

Similarly, when the own vehicle 100 turns left, the steering angle of the own vehicle 100 gradually increases during a period of time between a time of starting turning left and the middle of turning left of the own vehicle 100. Then, the steering angle of the own vehicle 100 gradually decreases after the middle of the turning left of the own vehicle 100. When the own vehicle 100 completes turning left, the steering angle of the own vehicle 100 is zero. Thus, in general, the turning radius of the actual turning route RTact along which the own vehicle 100 actually moves while turning left, gradually decreases during the period of time between the time of starting turning left and the middle of the turning left of the own vehicle 100. Then, the turning radius of the actual turning route RTact gradually increases after the middle of the turning left of the own vehicle 100. After the own vehicle 100 completes turning left, the turning radius of the actual turning route RTact is infinite. That is, after the own vehicle 100 completes turning left, the own vehicle 100 moves straight. Thus, the actual turning route RTact is a straight route as shown in FIG. 10 after the own vehicle 100 completes turning left.

Figure 11:
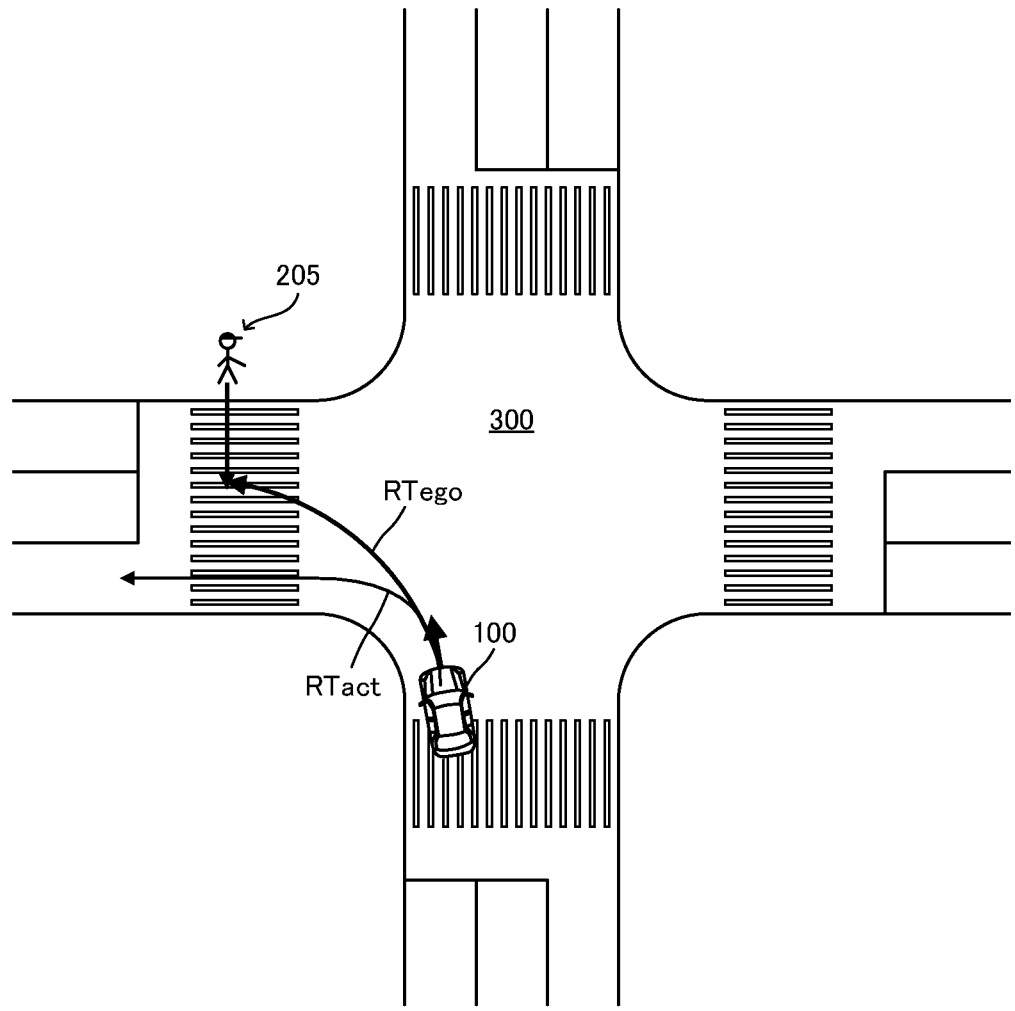
FIG. 11 is a view which shows the actual turning route and the predicted turning route immediately after the own vehicle starts to turn left.
Figure 12:
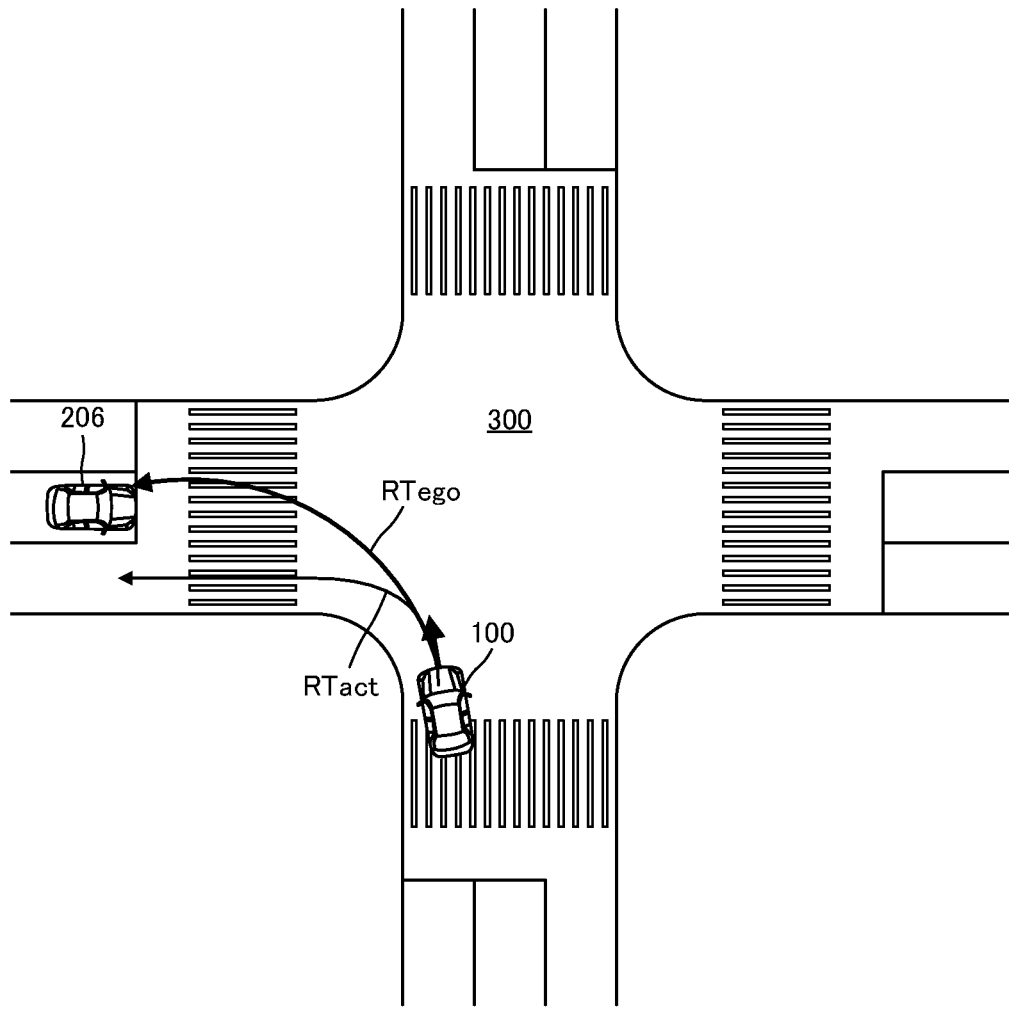
FIG. 12 is a view which shows the actual turning route and the predicted turning route immediately after the own vehicle starts to turn left.
Figure 13:
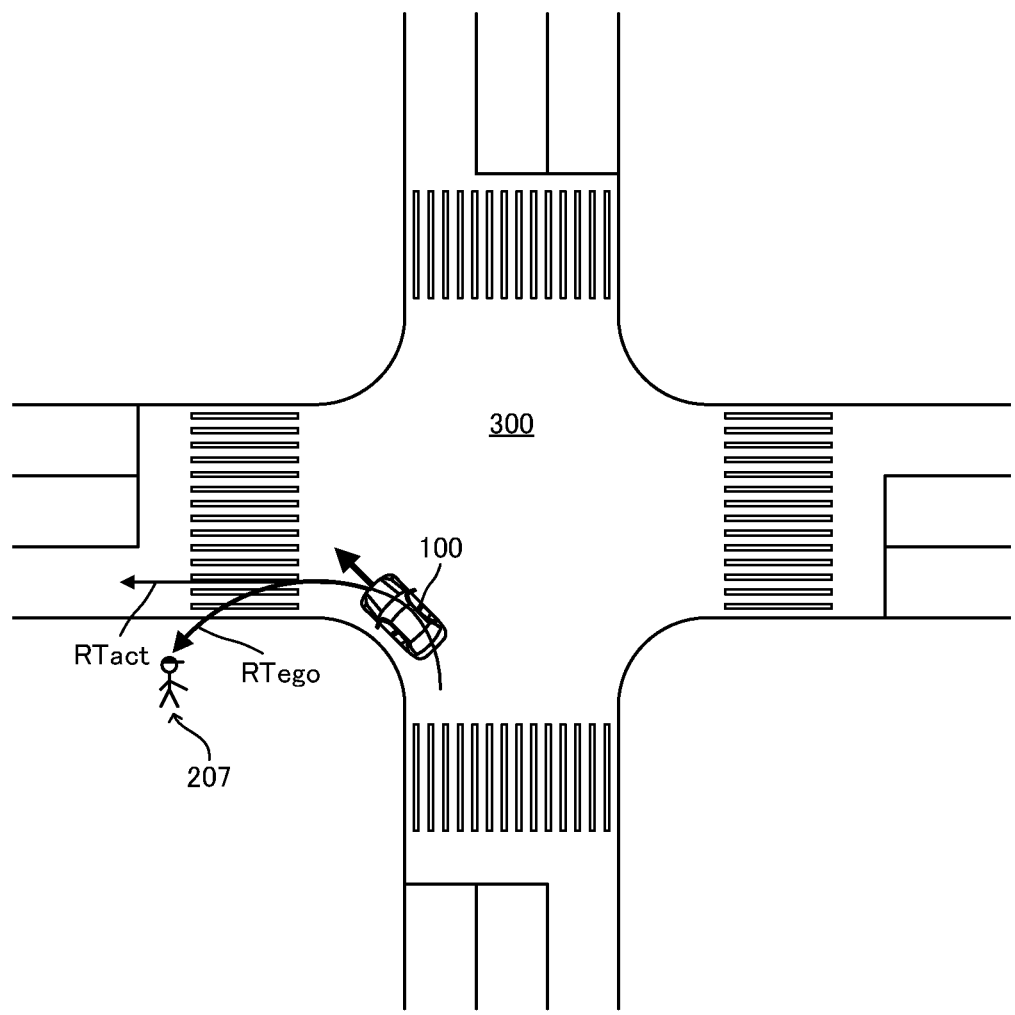
FIG. 13 is a view which shows the actual turning route and the predicted turning route at the middle of turning left of the own vehicle after the own vehicle starts to turn left.

On the other hand, as described above, in this embodiment, the vehicle collision avoidance assist apparatus 10 acquires the predicted turning route RTego, using the own vehicle yaw rate ω of the current time tnow. Thus, for example, as shown in FIG. 11 and FIG. 12, before the middle of the turning left of the own vehicle 100, the acquired predicted turning route RTego passes the right side of the actual turning route RTact in the road which the own vehicle 100 turning left reaches. That is, the predicted turning route RTego tends to deviate from the actual turning route RTact. Further, as shown in FIG. 13, at the middle of the turning left of the own vehicle 100, the acquired predicted turning route RTego passes the left side of the actual turning route RTact in the road which the own vehicle 100 turning left reaches. That is, the predicted turning route RTego tends to deviate from the actual turning route RTact.

Thus, as shown in FIG. 11, when the predicted turning route RTego passes the right side of the actual turning route RTact in the road which the own vehicle 100 turning left reaches, and the collision condition C2 is even satisfied for a pedestrian 205 walking along the crosswalk or the pedestrian crossing in the road which the own vehicle 100 turning left reaches, the own vehicle 100 may pass by the pedestrian 205. Further, as shown in FIG. 12, when the predicted turning route RTego passes the right side of the actual turning route RTact in the road which the own vehicle 100 turning left reaches, the collision condition C2 may be satisfied for an oncoming vehicle 206 stopped in an oncoming lane in the road which the own vehicle 100 turning left reaches. Even in this case, the own vehicle 100 does not collide with the oncoming vehicle 206 as far as the own vehicle 100 normally turns left. The execution of the collision avoidance control in such a situation is unnecessary.

Furthermore, as shown in FIG. 13, when the predicted turning route RTego passes the left side of the actual turning route RTact in the road which the own vehicle 100 turning left reaches, and the collision condition C2 is even satisfied for a person 207 on the sidewalk or the pavement in the road which the own vehicle 100 turning left reaches, the own vehicle 100 does not collide with the person 207 as far as the own vehicle 100 normally turns left. The execution of the collision avoidance control in such a situation is unnecessary.

In this regard, assuming that the own vehicle 100 collides with the pedestrian crossing the road which the own vehicle 100 turning right reaches, the own vehicle 100 collides with the pedestrian immediately before or after the own vehicle 100 completes turning right and starts to move straight. Thus, the angle defined by the moving direction of the own vehicle 100 and the moving direction of the pedestrian is generally 90 degrees when the own vehicle 100 collides with the pedestrian. Thus, in general, before the middle of the turning right of the own vehicle 100, the angle defined by the moving direction of the own vehicle 100 and the moving direction of the pedestrian is considerably different from 90 degrees. However, as the own vehicle 100 turns right further, the angle defined by the moving directions of the own vehicle 100 and the pedestrian gradually comes close to 90 degrees. Finally, the angle defined by the moving directions of the own vehicle 100 and the pedestrian becomes a value near 90 degrees when the own vehicle 100 collides with the pedestrian.

Figure 14:
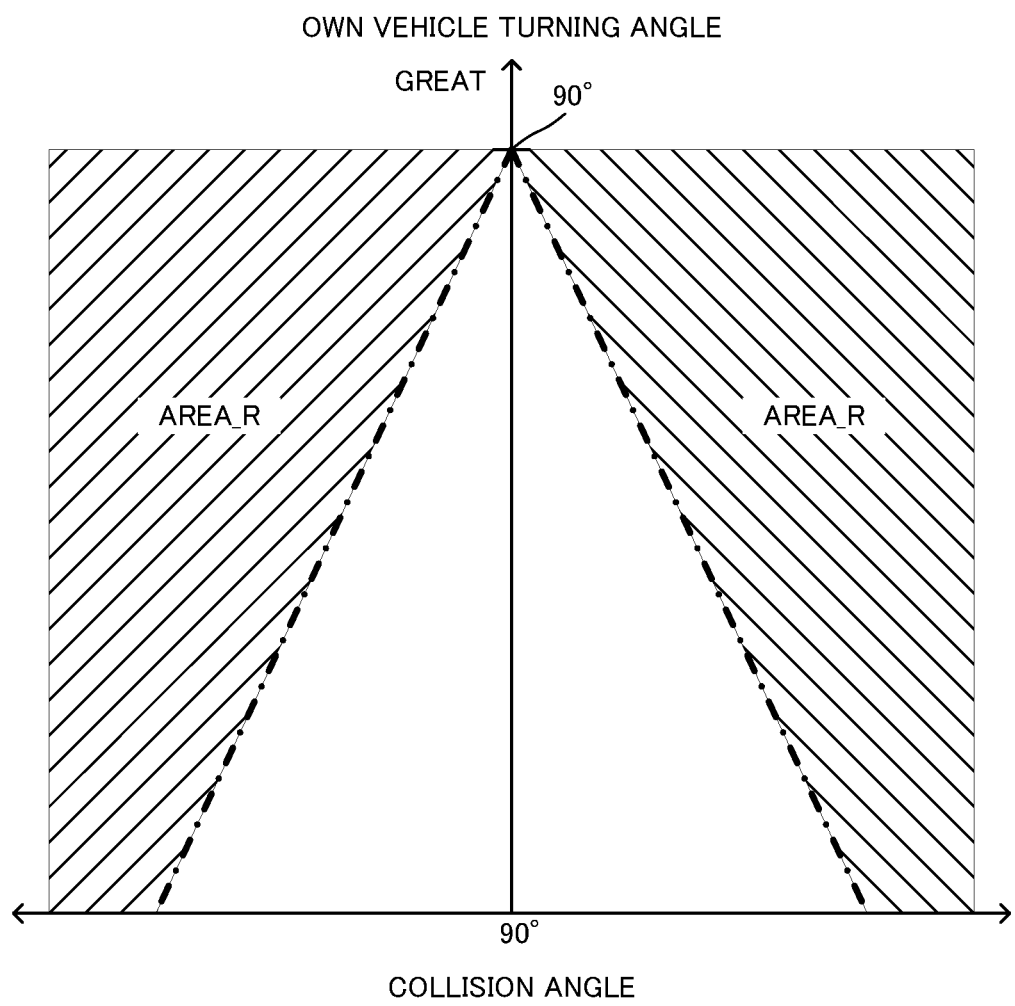
FIG. 14 is a view which shows a relationship between a collision angle, an own vehicle turning angle, and areas where a collision avoidance control is not executed.

Thus, if the execution of the collision avoidance control is forbidden when the angle defined by the moving directions of the own vehicle 100 and the pedestrian is in an area shown by a reference symbol AREA in FIG. 14 until the own vehicle 100 completes turning right after starting turning right, an unnecessary execution of the collision avoidance control can be prevented. It should be noted that in a graph shown in FIG. 14, the horizontal axis shows the collision angle θcol, and the vertical axis shows the own vehicle turning angle θego.

Figure 15A:
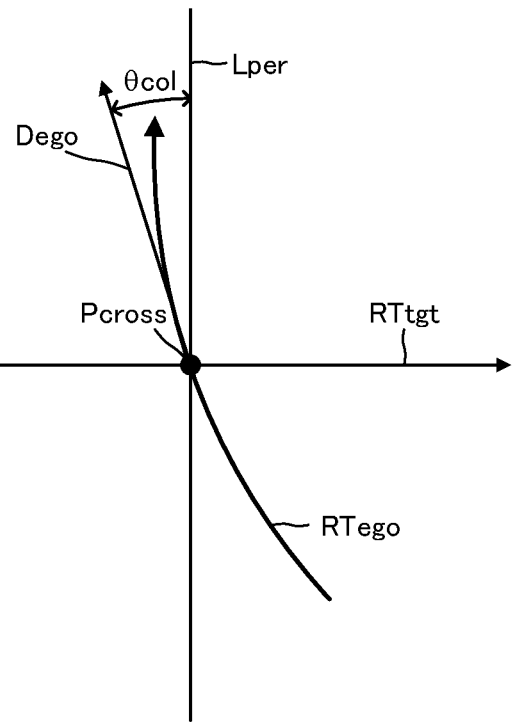
FIG. 15A and FIG. 15B are views which shows the collision angle.
Figure 15B:
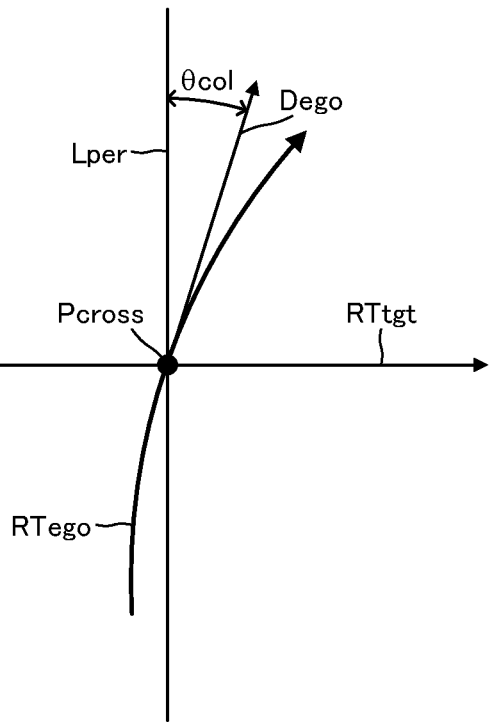

Accordingly, when the own vehicle turning condition C1 becomes satisfied, the vehicle collision avoidance assist apparatus 10 acquires a predicted moving direction Dego of the own vehicle 100 at the crossing point Pcross as shown in FIG. 15A and FIG. 15B. Then, the vehicle collision avoidance assist apparatus 10 acquires an angle defined by the acquired predicted moving direction Dego and an orthogonal line perpendicularly crossing the predicted moving route RTtgt as the collision angle θcol. It should be noted that FIG. 15A shows the collision angle θcol generally acquired after the own vehicle 100 starts turning right and before the middle of the turning right of the own vehicle 100, and FIG. 15B shows the collision angle θcol generally acquired after the middle of the turning right of the own vehicle 100.

While the own vehicle turning condition C1 is satisfied, i.e., the own vehicle 100 turns, the vehicle collision avoidance assist apparatus 10 determines whether the collision angle θcol is equal to or greater than a predetermined value, i.e., a collision angle threshold θcol_th. In addition, while the own vehicle turning condition C1 is satisfied, i.e., the own vehicle 100 turns, the vehicle collision avoidance assist apparatus 10 changes the collision angle threshold θcol_th, depending on the own vehicle turning angle θego.

In particular, the vehicle collision avoidance assist apparatus 10 calculates the own vehicle turning angle θego, using a formula (21) described below, based on the own vehicle yaw rate ω and the calculation cycle Δt.

$$\theta ego = \Sigma \omega \cdot \Delta t \quad (21)$$

It should be moted that the vehicle collision avoidance assist apparatus 10 may be configured to calculate a unit moving distance L, i.e., a distance which the own vehicle 100 moves during the calculation cycle Δt, using a formula (22) described below, based on the own vehicle moving speed Vego, the calculation cycle Δt, and an acceleration a of the own vehicle 100 and calculate the own vehicle turning angle θego, using a formula (23) described below, based on the unit moving distance L and the turning radius R.

$$L = V_{ego} \cdot \Delta t - (a \cdot \Delta t)^2 / 2 \quad (22)$$

$$\theta_{ego} = \Sigma L / R \quad (23)$$

Then, the vehicle collision avoidance assist apparatus 10 sets the collision angle threshold θcol_th to a value which decreases as the own vehicle turning angle θego increases. In this embodiment, the vehicle collision avoidance assist apparatus 10 sets the collision angle threshold θcol_th to an initial value greater than zero when the own vehicle turning angle θego is zero. Further, the vehicle collision avoidance assist apparatus 10 sets the collision angle threshold θcol_th to zero or a value slightly greater than zero when the own vehicle turning angle θego is 90 degrees.

Then, the vehicle collision avoidance assist apparatus 10 determines that the collision avoidance forbiddance condition C3 is satisfied when the collision angle θcol is equal to or greater than the collision angle threshold θcol_th.

When the collision avoidance forbiddance condition C3 is satisfied, and the collision condition C2 is even satisfied, the vehicle collision avoidance assist apparatus 10 does not execute the collision avoidance control. When the collision avoidance forbiddance condition C3 is not satisfied, and the collision condition C2 is satisfied, the vehicle collision avoidance assist apparatus 10 executes the collision avoidance control.

Advantages

The summary of the operations of the vehicle collision avoidance assist apparatus 10 has been described. With the vehicle collision avoidance assist apparatus 10, the collision angle threshold θcol_th is changed, depending on the own vehicle turning angle θego. Thus, the unnecessary execution of the collision avoidance control can be avoided when the own vehicle 100 turns right or left.

Modified Example 1

It should be noted that the vehicle collision avoidance assist apparatus 10 may be configured to set the predetermined predicted reaching time TTCth to a smaller value in place of not executing the collision avoidance control when the collision angle θcol is equal to or greater than the collision angle threshold θcol_th. Thereby, the unnecessary execution of the collision avoidance control can be avoided when the own vehicle 100 turns right or left.

Modified Example 2

Further, the vehicle collision avoidance assist apparatus 10 may be configured to calculate the predicted moving route RTtgt only for the detected object 200 having the object ground speed Vtgt greater than zero and equal to or smaller than a predetermined speed. That is, the vehicle collision avoidance assist apparatus 10 may be configured to execute the collision avoidance control only for the detected object 200 having the object ground speed Vtgt greater than zero and equal to or smaller than the predetermined speed.

<Specific Operations of Vehicle Collision Avoidance Assist Apparatus>

Figure 16:
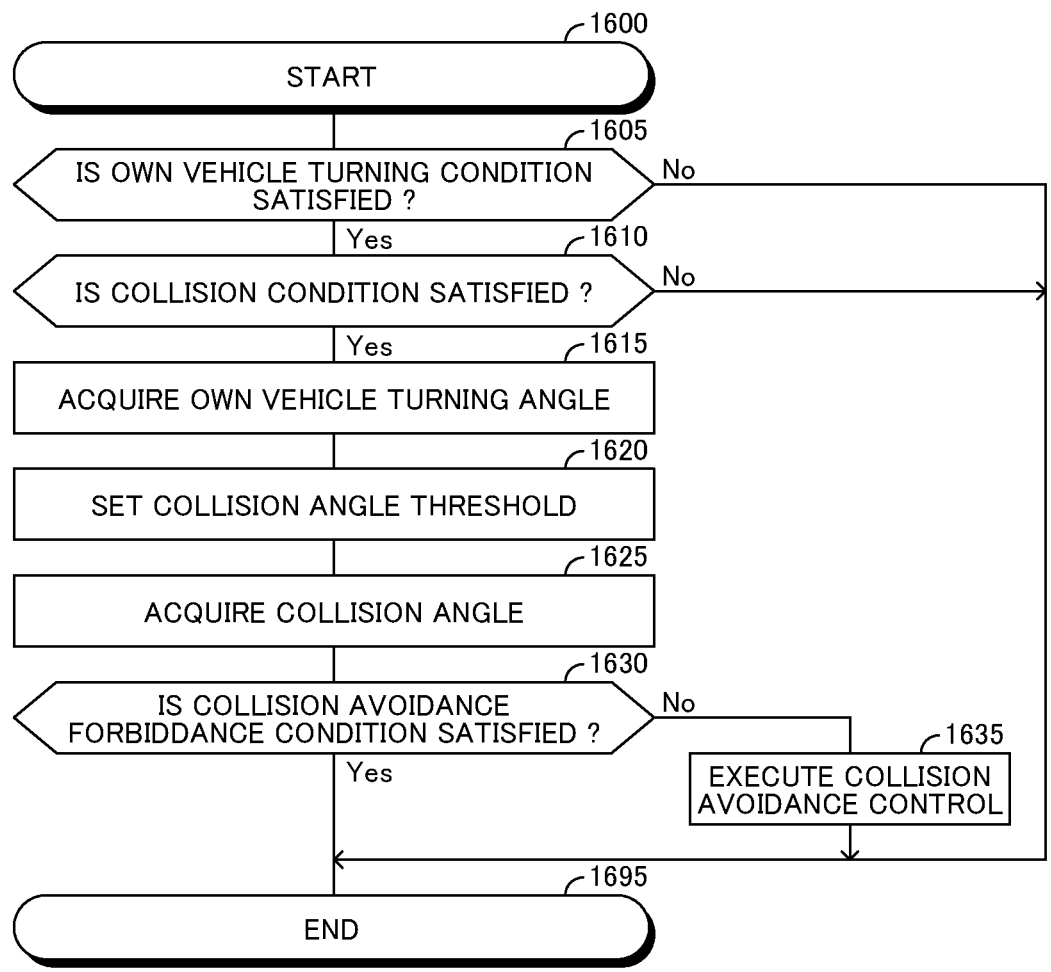
FIG. 16 is a view which shows a flowchart of a routine executed by the vehicle collision avoidance assist apparatus according to the embodiment of the invention.

Next, an example of specific operations of the vehicle collision avoidance assist apparatus 10 will be described. The CPU of the ECU 90 of the vehicle collision avoidance assist apparatus 10 is configured or programmed to execute a routine shown in FIG. 16 with a predetermined calculation cycle. Thus, at a predetermined timing, the CPU starts a process from a step 1600 of the routine shown in FIG. 16 and proceeds with the process to a step 1605 to determine whether the own vehicle turning condition C1 is satisfied.

When the CPU determines "Yes" at the step 1605, the CPU proceeds with the process to a step 1610 to determine whether the collision condition C2 is satisfied.

When the CPU determines "Yes" at the step 1610, the CPU proceeds with the process to a step 1615 to calculate the own vehicle turning angle θego. The own vehicle turning angle θego acquired this time is the own vehicle turning angle θego from when the own vehicle turning condition C1 becomes satisfied to the current time.

Next, the CPU proceeds with the process to a step 1620 to set the collision angle threshold θcol_th, based on the own vehicle turning angle θego calculated at the step 1615.

Next, the CPU proceeds with the process to a step 1625 to calculate the collision angle θcol. Next, the CPU proceeds with the process to a step 1630 to determine whether the collision avoidance forbiddance condition C3 is satisfied, based on the collision angle θcol acquired at the step 1625 and the collision angle threshold θcol_th set at the step 1620.

When the CPU determines "Yes" at the step 1630, the CPU proceeds with the process directly to a step 1695 to terminate this routine once. Thereby, the collision avoidance control is not executed.

On the other hand, when the CPU determines "No" at the step 1630, the CPU proceeds with the process to a step 1635 to execute the collision avoidance control. Next, the CPU proceeds with the process to the step 1695 to terminate this routine once.

Further, when the CPU determines "No" at the step 1605 or 1610, the CPU proceeds with the process directly to the step 1695 to terminate this routine once. In this case, the collision avoidance control is not executed.

One example of the specific operations of the vehicle collision avoidance assist apparatus 10 has been described.

It should be noted that the invention is not limited to the aforementioned embodiments, and various modifications can be employed within the scope of the invention.

What is claimed is:

1. A vehicle collision avoidance assist apparatus comprising an electronic control unit configured to:
  predict a turning route of an own vehicle and a moving route of an object ahead of the own vehicle when the own vehicle turns;
  acquire a collision angle which corresponds to a deviating amount of a moving direction of the own vehicle from a line orthogonal to the moving route of the object at a point where the turning route crosses the moving route;
  keep stopping a collision avoidance control to avoid a collision of the own vehicle with the object when a forbiddance condition is satisfied, and a collision condition is satisfied,
    the forbiddance condition being that the collision angle is equal to or greater than a predetermined collision angle threshold, and
    the collision condition being that the own vehicle is going to collide with the object; and
  execute the collision avoidance control when the forbiddance condition is not satisfied, and the collision condition is satisfied,
  wherein the electronic control unit is configured to:
    while the own vehicle turns, acquire an own vehicle turning angle which the own vehicle has turned about a turning center from when the own vehicle starts turning; and set the predetermined collision angle threshold such that the predetermined collision angle threshold set for a greater own vehicle turning angle is smaller than the predetermined collision angle threshold set for a smaller own vehicle turning angle.

2. The vehicle collision avoidance assist apparatus as set forth in claim 1, wherein the electronic control unit is configured to predict the turning route of the own vehicle, based on a yaw rate of the own vehicle.

3. The vehicle collision avoidance assist apparatus as set forth in claim 1, wherein the electronic control unit is configured to:

acquire a predicted reaching time predicted to be taken for the own vehicle to reach the moving route of the object; and acquire an object position of the object with respect to the own vehicle when the own vehicle reaches the moving route of the object, and wherein the collision condition becomes satisfied when the predicted reaching time is equal to or smaller than a predetermined predicted reaching time, and the object position is within a width of the own vehicle.

4. A non-volatile memory storing a program that when executed by at least one processor, cause the at least one processor to:

predict a turning route of an own vehicle and a moving route of an object ahead of the own vehicle when the own vehicle turns;

acquire a collision angle which corresponds to a deviating amount of a moving direction of the own vehicle from a line orthogonal to the moving route of the object at a point where the turning route crosses the moving route;

keep stopping a collision avoidance control to avoid a collision of the own vehicle with the object when a forbiddance condition is satisfied, and a collision condition is satisfied, the forbiddance condition being that the collision angle is equal to or greater than a predetermined collision angle threshold, the collision condition being that the own vehicle is going to collide with the object; and execute the collision avoidance control when the forbiddance condition is not satisfied, and the collision condition is satisfied, wherein the vehicle collision avoidance assist program is programmed to:

while the own vehicle turns, acquire an own vehicle turning angle which the own vehicle has turned about a turning center from when the own vehicle starts turning; and set the predetermined collision angle threshold such that the predetermined collision angle threshold set for a greater own vehicle turning angle is smaller than the predetermined collision angle threshold set for a smaller own vehicle turning angle.

\* \* \* \* \*